United States Patent
Yun

(10) Patent No.: US 11,828,975 B2
(45) Date of Patent: Nov. 28, 2023

(54) HIGH-EFFICIENCY LIGHTING DEVICE WITH REDUCED BLUE LIGHT

(71) Applicant: SCL., LTD, Daejeon (KR)

(72) Inventor: Jae Jin Yun, Daejeon (KR)

(73) Assignee: SCL., LTD, Daejeon (KR)

( * ) Notice: Subject to any disclaimer, the term of this patent is extended or adjusted under 35 U.S.C. 154(b) by 0 days.

(21) Appl. No.: 17/979,398

(22) Filed: Nov. 2, 2022

(65) Prior Publication Data
US 2023/0138607 A1  May 4, 2023

(30) Foreign Application Priority Data

Nov. 3, 2021 (KR) .................. 10-2021-0150077

(51) Int. Cl.
*F21V 8/00* (2006.01)
(52) U.S. Cl.
CPC ......... *G02B 6/0068* (2013.01); *G02B 6/0073* (2013.01)
(58) Field of Classification Search
CPC ..................... G02B 6/0068; G02B 6/0073
USPC ................................. 362/600–634
See application file for complete search history.

(56) References Cited

U.S. PATENT DOCUMENTS

| 6,608,614 B1* | 8/2003 | Johnson | H05B 45/20 |
| | | | 362/97.3 |
| 2012/0300495 A1* | 11/2012 | Kim | G02B 6/0026 |
| | | | 362/606 |
| 2017/0064789 A1* | 3/2017 | Wang | G02B 6/0081 |

FOREIGN PATENT DOCUMENTS

| KR | 10-0949194 B1 | 3/2010 |
| KR | 10-2020-0040340 A | 4/2020 |
| KR | 10-2171483 B1 | 10/2020 |

* cited by examiner

*Primary Examiner* — Andrew J Coughlin
*Assistant Examiner* — Jessica M Apenteng
(74) *Attorney, Agent, or Firm* — Dorton & Willis, LLP

(57) ABSTRACT

A lighting device capable of maintaining high efficiency while reducing blue light. The lighting device includes: a first light source; and a second light source having lower light efficiency than the first light source and having a lower light intensity than the first light source in a blue light wavelength region, in which power is supplied to the first light source and the second light source so that a ratio of power consumption of the first light source to power consumption of the second light source becomes 1:n, and n is greater than 1.

7 Claims, 30 Drawing Sheets

FIG. 26

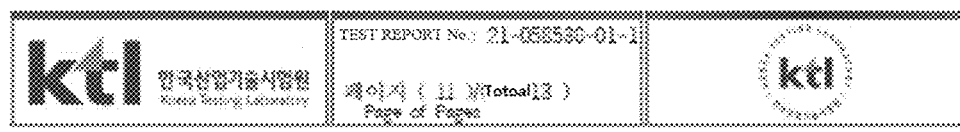

< PART LIST >

| PART NAME | MANUFACTURER | MODEL NAME | RATING | | CERTIFICATION STANDARD |
|---|---|---|---|---|---|
| LED CONVERTER | KB TECH CO., LTD. | KLG320H6BF10A | INPUT: AC 220 V, 60 Hz, 0.05 A, 10 W<br>OUTPUT: max DC 62 V, 0.24 A | 1 | KS (No.10-0258) |
| LED Package | SAMSUNG ELECTRONICS CO., LTD. | SPMWHO32AMD EXAC0SM | VF = (2.6~2.9) V (@IF = 65 mA)<br>(COLOR TEMPERATURE: 5 700 K) | 12 | -- |
| | GLB TECH | S-G3030PN2P3 3030 HIGH CRI | VF = (2.7~3.3) V (@IF = 65 mA)<br>(COLOR TEMPERATURE: 5 700 K) | 48 | -- |
| LED PCB | FORCM | -- | CEM-1, ⌀108 mm, 1.6 T | 1 | -- |
| DIFFUSE COVER | DAEHO LIGHTING | -- | PC, ⌀137 mm, 1.5 T | 1 | -- |
| HEAT SINK | FRONT SURFACE | DAEHO LIGHTING | -- | ⌀(172 x 46.1) mm, 0.7 T | 1 | -- |
| | REAR SURFACE | CHOIL ALUMINUM | | AL, ⌀136 mm, 1.0 T | 1 | -- |
| ENC- LOSURE | FRONT SURFACE | DAEHO LIGHTING | -- | ⌀(172 x 46.1) mm, 0.7 T | 1 | -- |
| | REAR SURFACE | CHOIL ALUMINUM | | AL, ⌀136 mm, 1.0 T | 1 | -- |
| REMARKS | -- HEAT SINK AND ENCLOSURE ARE SAME | | | | |

HIGH-EFFICIENCY LIGHTING DEVICE WITH REDUCED BLUE LIGHT

CROSS REFERENCE TO RELATED APPLICATIONS

This application claims the benefit of priority under 35 U.S.C. § 119(a) to Korean Patent Application No. 10-2021-0150077, filed on Nov. 3, 2021 (pending), the disclosure of which is hereby incorporated by reference in its entirety.

TECHNICAL FIELD

The present disclosure relates to a lighting device, and more particularly, to a high-efficiency lighting device with reduced blue light.

BACKGROUND

Light from an edge-type lighting device having a general white light emitting diode (LED) has a very high spectral distribution of blue light.

Blue light is light corresponding to a wavelength region of 415 nm to 495 nm among visible light. This blue light is light of a very short wavelength reaching the human retina and at the same time has very high photon energy.

Recently, as lighting devices having high-efficiency LEDs have been widely distributed, the harmfulness of blue light to the human body has been controversial. This is due to the fact that such LED lighting devices are manufactured based on LEDs emitting blue light.

According to medical literature, blue light has various effects on human physiology and is known to provide harmful and beneficial effects. A specific example of the harmfulness of the blue light will be described below.

That is, some cells in the human retina have a fluorophore called A2E. This fluorphore absorbs light in the vicinity of a wavelength region of 440 nm best, and this A2E leads to the generation of reactive oxygen when excited by blue light. The active oxygen attacks main constituent molecules of a cell membrane, and since the cell membrane is densely distributed in the retina, it is extremely sensitive to such oxidative stress. In general, the active oxygen is removed through a function of retinal pigment epithelium (RPE).

However, when excessive oxidative stress is continuously applied to the retina, damage to the retinal cells may be caused. This accumulation of damage is one of the potential causes of the development of macular degeneration. The above-described phototoxicity of blue light to retinal pigment epithelial cells is considered to be concentrated in the wavelength region of 415 nm to 455 nm.

when the blue light generated from the LED is excessively exposed to an eyeball, eye fatigue is aggravated, and serious diseases such as macular degeneration can be caused by the blue light that reaches the retina directly. In addition, insomnia may be caused by abnormal melatonin secretion, and cancer may be caused by increased estrogen levels due to insufficient melatonin secretion.

SUMMARY

In view of the above, The present disclosure provides a lighting device capable of maintaining high efficiency while reducing blue light.

According to embodiments of the present disclosure, a lighting device includes: a first light source; and a second light source having lower light efficiency than the first light source and having a lower light intensity than the first light source in a blue light wavelength region, in which power may be supplied to the first light source and the second light source so that a ratio of power consumption of the first light source and power consumption of the second light source becomes 1:n, and n may be greater than 1.

n may be 3.8 to 4.5.

The first light source and the second light source may be provided in plurality, and the ratio of the number of the first light sources and the number of the second light sources may be 1:n.

The lighting device may further include a light source circuit board on which the first light source and the second light source are mounted, in which the light source circuit board may further include a pattern layer connected to the first light source and the second light source, the pattern layer may include a first region in which the first light source is arranged and a second region in which the second light source is arranged, and an area of the first region may be larger than that of the second region.

The lighting device may further include: a light guide plate guiding the light from the first light source and the light from the second light source in a specific direction.

The first light source and the second light source may be arranged in a direct type.

The first light source may be arranged to face a side surface of the light guide plate, and the second light source may be arranged to face an upper surface of the light guide plate.

The light guide plate may include a light guide pattern arranged on an upper surface of the light guide plate.

The second light source may have a closer match rate to a solar spectrum than the first light source.

The first light source may be a white LED; and the second light source may be a natural LED.

The lighting device according to the present disclosure can sufficiently satisfy reference light efficiency of a high-efficiency lighting device while emitting a smaller amount of blue light (i.e., blue light) than a lighting device using only a white LED.

Accordingly, the lighting device of the present disclosure can comply with the light efficiency reference (e.g., 100 lm/W) according to the Energy Use Rationalization Act applied in the construction of domestic buildings while reducing blue light harmful to the human body.

BRIEF DESCRIPTION OF THE DRAWINGS

FIGS. 26 to 31 are diagrams for describing the effect according to the lighting device of the present disclosure.

DETAILED DESCRIPTION

Figure 1:
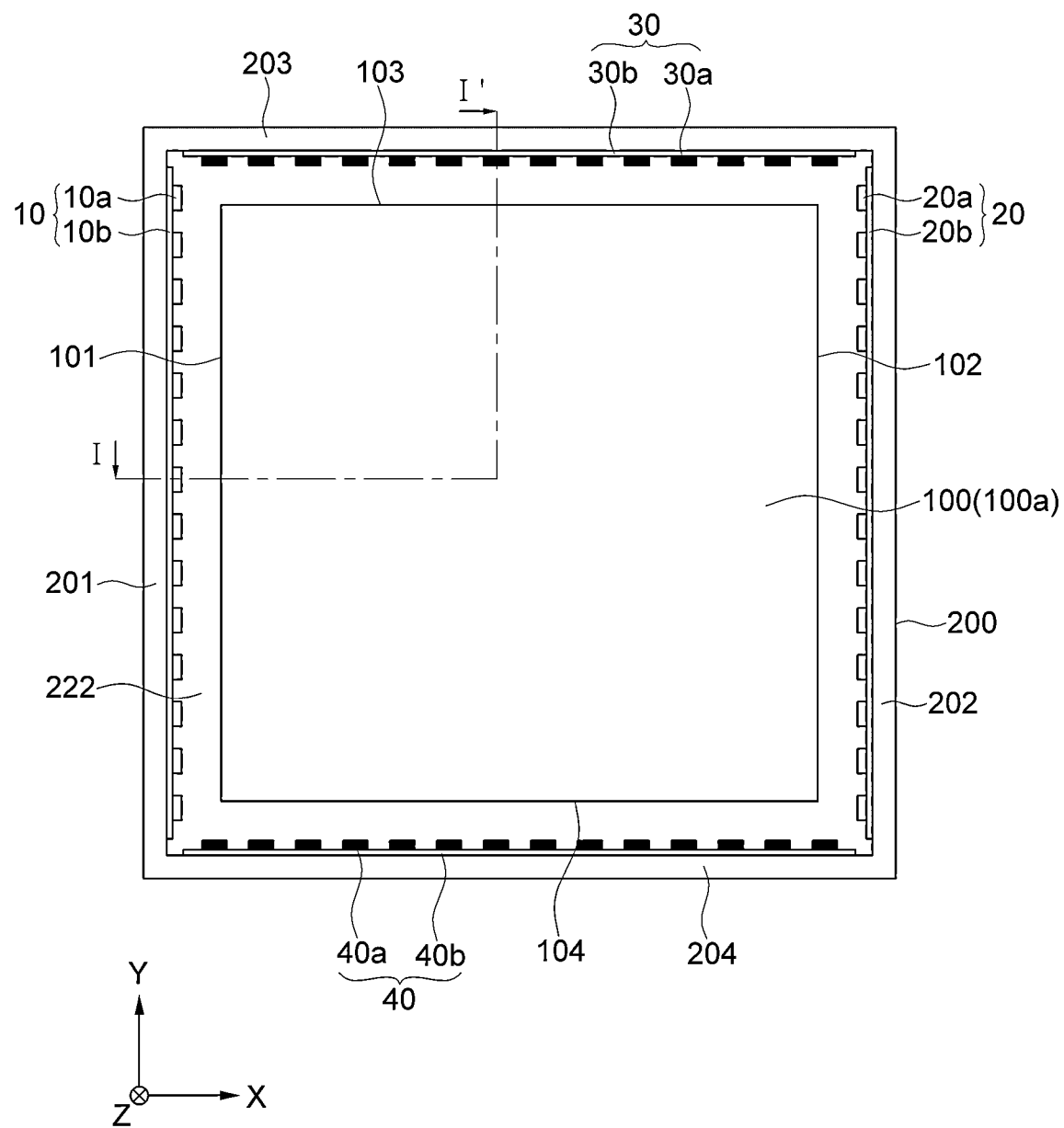
FIG. 1 is a plan view of a lighting device according to an embodiment of the present disclosure.

Various advantages and features of the present disclosure and methods accomplishing them will become apparent from the following description of embodiments with reference to the accompanying drawings. However, the present disclosure is not limited to exemplary embodiments to be described below, but may be implemented in various different forms, these exemplary embodiments will be provided only in order to make the present disclosure complete and allow those skilled in the art to completely recognize the scope of the present disclosure, and the present disclosure will be defined by the scope of the claims. Accordingly, in some embodiments, well-known process steps, well-known device structures, and well-known techniques have not been specifically described in order to avoid obscuring the present disclosure. Throughout the specification, like reference numerals denote like elements.

Thicknesses are enlarged to clearly show several layers and regions. Throughout the present disclosure, like components will be denoted by like reference numerals. It will be understood that when an element such as a layer, a film, a region, or a substrate is referred to as being "on" another element, it may be "right on" another element or may have an intervening element present therebetween. On the other hand, when an element is "right on" another component, there is no object therebetween. In addition, when an element such as a layer, a film, a region, and a plate is "below" another component, it may be "right below" the other element or intervening elements may be present therebetween. On the other hand, when an element is "just under" another component, there is no object therebetween.

Spatially relative terms "below," "beneath," "lower," "above," "upper," and the like may be used to easily describe the correlation between one element or component and other elements or components as illustrated in drawings. The spatially relative terms should be understood as terms including different directions of elements during use or operation in addition to the directions illustrated in the drawings. For example, in a case of overturning element illustrated in the drawings, an element described as "below" or "beneath" another element may be placed "above" the other element. Therefore, the illustrative term "below" may include both downward and upward directions. The components can also be aligned in different directions, and therefore the spatially relative terms can be interpreted according to the alignment.

In the present specification, when a part is connected to another part, it includes not only the case where it is directly connected, but also the case where it is electrically connected with another element interposed therebetween. In addition, unless explicitly described to the contrary, "including" any component will be understood to imply the inclusion of other components rather than the exclusion of other components.

In the present specification, the terms such as "first", "second", and "third", may be used to describe various components, but the components are not to be construed as being limited to the terms. The terms are used only in order to distinguish one component from another component. For example, without departing from the scope of the present disclosure, a first component may be referred to as a second or third component, and similarly, second or third component may be alternately named.

Unless defined otherwise, all terms (including technical and scientific terms) used in the present specification have the same meaning as meanings commonly understood by those skilled in the art to which the present disclosure pertains. In addition, terms defined in commonly used dictionary are not ideally or excessively interpreted unless explicitly defined otherwise.

Hereinafter, a lighting device according to the present disclosure will be described in detail with reference to FIGS. 1 to 31.

Figure 2:
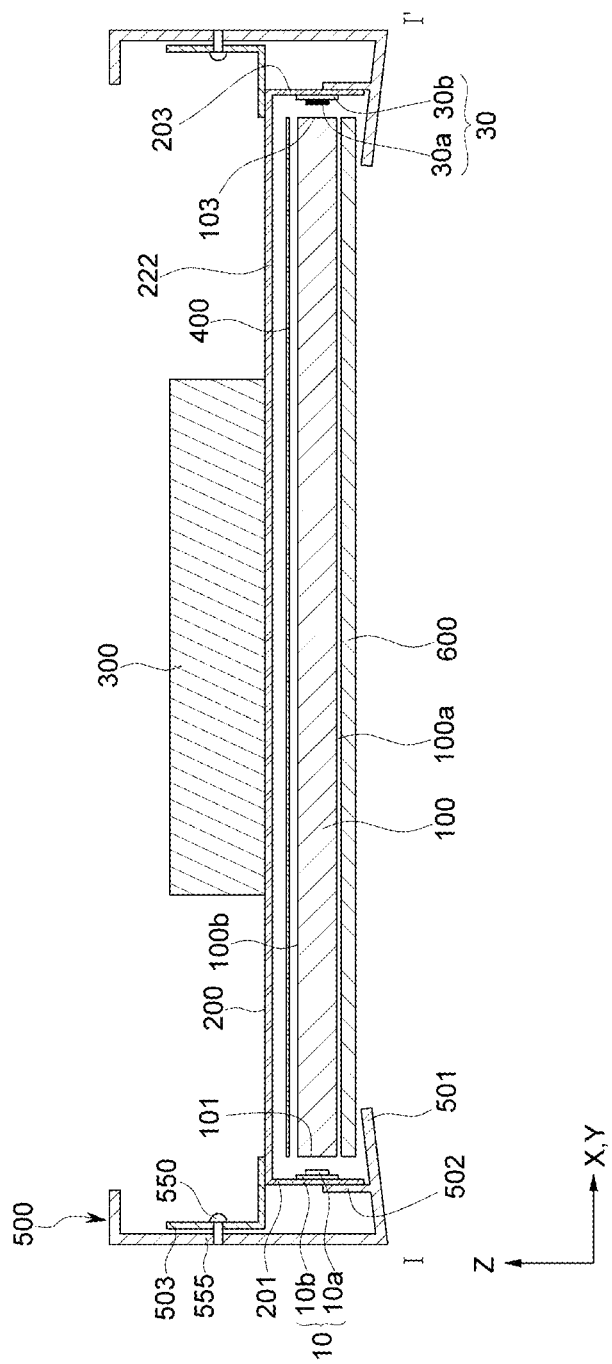
FIG. 2 is a cross-sectional view taken along line I-I' of FIG. 1.
Figure 3:
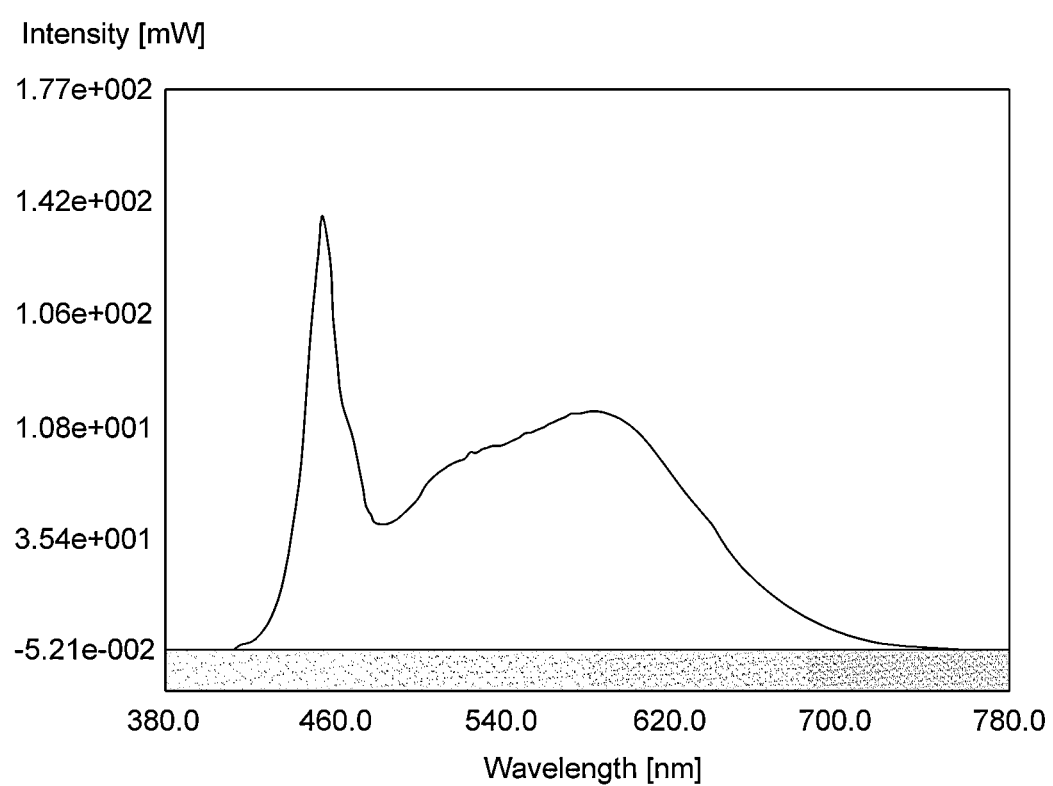
FIG. 3 is a diagram illustrating spectral distributions of a first light source and a second light source of FIG. 1.
Figure 4:
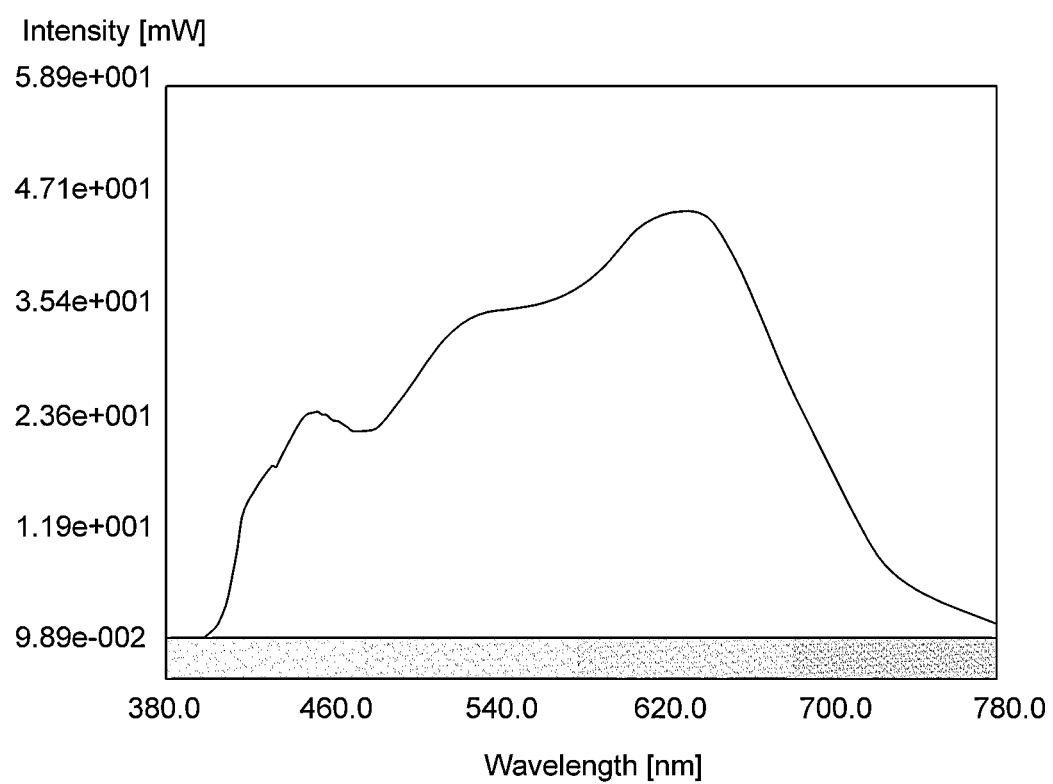
FIG. 4 is a diagram illustrating spectral distributions of a third light source and a fourth light source of FIG. 1.

FIG. 1 is a plan view of a lighting device according to an embodiment of the present disclosure, FIG. 2 is a cross-sectional view taken along line I-I' of FIG. 1, and FIG. 3 is a diagram illustrating spectral distributions of a first light source 10a and a second light source 20a of FIG. 1, and FIG. 4 is a diagram illustrating spectral distributions of a third light source 30a and a fourth light source 40a of FIG. 1.

As illustrated in FIGS. 1 and 2, a lighting device according to an embodiment of the present disclosure may include a first light source module 10, a second light source module 20, a third light source module 30, a fourth light source module 40, a cover part 200, a support part 500, a reflective sheet 400, a light guide plate 100, a diffusion plate 600, and a power supply unit 300.

The cover part 200 includes a storage space in which the first light source module 10, the second light source module 20, the third light source module 30, the fourth light source module 40, the reflective sheet 400, the light guide plate 100, and the diffusion plate 600 as described above may be accommodated. In order to secure such a storage space, as in one example illustrated in FIGS. 1 and 2, the cover part 200 may include a base part 222 and a plurality of side portions 201, 202, 203, and 204 protruding from the base part 222.

The plurality of side portions 201, 202, 203, and 204 may include first to fourth sides 201, 202, 203, and 204, as in one example illustrated in FIG. 2. The first side portion 201 extends from a first edge of the base part 222 along a reverse direction (hereinafter, −Z axis direction) of a Z axis, the second side portion 202 extends from a second edge of the base part 222 along the −Z axis direction, the third side portion 203 extends from a third edge of the base part 222 along the −Z-axis direction, and the fourth side portion 204 extends from a fourth edge of the base part 222 along the −Z axis Here, the first side portion 201 and the second side portion 202 are disposed on the first edge and the second edge of the base part 222, respectively, to face each other in the X-axis direction, and the third side portion 203 and the fourth side portion 204 are disposed on the third edge and the fourth edge of the base part 222, respectively, to face each other in the Y-axis direction.

The light guide plate 100 is located inside the cover part 200. Two surfaces 100a and 100b facing each other in the Z-axis direction among the surfaces of the light guide plate 100 may be defined as the lower surface 100a and the upper surface 100b of the light guide plate 100, respectively, two surfaces 201 and 202 facing each other in the X-axis direction among the surfaces of the light guide plate 100 may be defined as a first side surface 101 and a second side surface 102 of the light guide plate 100, respectively, and two surfaces facing each other in the Y-axis direction among the surfaces of the light guide plate 100 may be defined as a third side surface 103 and a fourth side surface 104 of the light guide plate 100, respectively.

Meanwhile, although not illustrated, a plurality of light guide patterns may be arranged on the upper surface 100b of the light guide plate 100. These light guide patterns serve to help the light incident on the side surface of the light guide plate 100 to proceed well to the side surface opposite thereto.

The light guide plate 100 may be made of a light-transmitting material to be able to efficiently guide light, for example, an acrylic resin such as PMMA (polymethylmethacrylate) or a material such as a polycarbonate (PC). In addition, the light guide plate 100 may be made of a glass material.

The first to fourth light source modules 10, 20, 30, and 40 may be arranged between each side portion 201, 202, 203, and 204 of the cover part 200 and each side surface 101, 102, 103, and 104 of the light guide plate 100 in the storage space described above. For example, as illustrated in FIG. 1, the first light source module 10 may be arranged between the first side portion 201 of the cover part 200 and the first side surface 101 of the light guide plate 100, the second light source module 20 may be arranged between the second side portion 202 of the cover part 200 and the second side surface 102 of the light guide plate 100, the third light source module 30 may be arranged between the third side portion 203 of the cover part 200 and the third side surface 103 of the light guide plate 100, and the fourth light source module 40 may be arranged between the fourth side portion 204 of the cover part 200 and the fourth side surface 104 of the light guide plate 100.

The first light source module 10 may include a first light source circuit board 10b and at least one first light source 10a mounted on the first light source circuit board 10b. A light exit surface of the first light source 10a faces the first side surface 101 of the light guide plate 100.

The first light source 10a generates light. For example, the first light source 10a may be a white LED that emits white light. As a specific example, the first light source 10a may include a blue light emitting diode that emits blue light and a phosphor surrounding the blue light emitting diode. The blue light from the blue light emitting diode may be converted into the white light while passing through the phosphor. As another specific example, the first light source 10a may include a red light emitting diode that emits red light, a green light emitting diode that emits green light, and a blue light emitting diode that emits blue light. The white light may be generated by mixing the red light from the red light emitting diode, the green light from the green light emitting diode, and the blue light from the blue light emitting diode.

The X-axis of FIG. 3 represents a wavelength of light, and the Y-axis of FIG. 3 represents a light intensity. The light from the first light source 10a may have a spectral distribution as illustrated in FIG. 3. For example, the light from the first light source 10a may have a maximum intensity (e.g., 136 mW) at a blue wavelength of 454 nm. Here, the spectral distribution of FIG. 3 shows a spectral distribution at a color temperature (or correlated color temperature) of 5335K. Meanwhile, the white light emitting diode (LED) used as the first light source 10a shows a match rate of 72% with a solar spectrum at a color temperature of 2700K, a match rate of 71% with a solar spectrum at a color temperature of 3000K, a match rate of 72% with a solar spectrum at a color temperature of 4000K, a match rate of 72% with a solar spectrum at a color temperature of 5000K, and a match rate of 73% with a solar spectrum at a color temperature of 6500K.

When the first light source module 10 includes a plurality of first light sources 10a, the plurality of first light sources 10a are arranged along the first side surface 101 of the light guide plate 100. For example, the plurality of first light sources 10a are arranged along the Y-axis direction while facing the first side surface 101 of the light guide plate 100.

One surface of the first light source circuit board 10b may be divided into at least one mounting area and a wiring area. When the first light source module 10 includes a plurality of first light sources 10a, one first light source 10a may be arranged in each mounting area, and a plurality of power supply lines for transmitting power to the first light sources 10a may be arranged in the wiring area.

The light from the first light source 10a is incident on the first side surface 101 of the light guide plate 100. The light incident on the first side surface 101 may be totally reflected by the light guide pattern and proceed to the second side surface 102 of the light guide plate 100. In this case, the light incident on the first side surface 101 of the light guide plate 100 proceeds to the diffusion plate 600 through the lower surface 100a of the light guide plate 100.

The second light source module 20 may include a second light source circuit board 20b and at least one second light source 20a mounted on the second light source circuit board 20b. A light exit surface of the second light source 20a faces the second side surface 102 of the light guide plate 100.

The second light source 20a generates light. The second light source 20a may be the same type of light source as the above-described first light source 10a. For example, the second light source 20a may be a white LED that emits white light. As a specific example, the second light source 20a may include a blue LED that emits blue light and the phosphor surrounding the blue LED. The blue light from the blue light emitting diode may be converted into the white light while passing through the phosphor. As another specific example, the second light source 20a may include a red light emitting diode that emits red light, a green light emitting diode that emits green light, and a blue light emitting diode that emits blue light. The white light may be generated by mixing the red light from the red light emitting diode, the green light from the green light emitting diode, and the blue light from the blue light emitting diode.

As illustrated in FIG. 3, the light from the second light source 20a may have a maximum intensity (e.g., 136 mW) at a blue wavelength of 454 nm. In addition, like the white LED used as the above-described first light source 10a, the white LED used as the second light source 20a shows a match rate of 72% with a solar spectrum at a color temperature of 2700K, a match rate of 71% with a solar spectrum at a color temperature of 3000K, a match rate of 72% with a solar spectrum at a color temperature of 4000K, a match rate of 72% with a solar spectrum at a color temperature of 5000K, and a match rate of 73% with a solar spectrum at a color temperature of 6500K.

When the second light source module 20 includes a plurality of second light sources 20a, the plurality of second light sources 20a are arranged along the second side surface 102 of the light guide plate 100. For example, the plurality of second light sources 20a are arranged along the Y-axis direction while facing the second side surface 102 of the light guide plate 100.

One surface of the second light source circuit board 20b may be divided into at least one mounting area and a wiring area. When the second light source module 20 includes the plurality of second light sources 20a, one second light source 20a may be arranged in each mounting area, and a plurality of power supply lines for transmitting power to the second light sources 20a may be arranged in a wiring area.

The light from the second light source 20a is incident on the second side surface 102 of the light guide plate 100. The light incident on the second side surface 102 may be totally reflected by the light guide pattern and proceed to the first side surface 101 of the light guide plate 100. In this case, the light incident on the second side surface 102 of the light guide plate 100 proceeds to the diffusion plate 600 through the lower surface 100a of the light guide plate 100.

The third light source module 30 may include a third light source circuit board 30b and at least one third light source 30a mounted on the third light source circuit board 30b. A light exit surface of the third light source 30a faces the third side surface 103 of the light guide plate 100.

The third light source 30a generates light. The third light source 30a may be different types of light sources from the first light source 10a. For example, the third light source 30a may have a lower light intensity in a blue wavelength region than the first light source 10a, have a lower light efficiency than the first light source 10a, and may have a closer match rate to the solar spectrum than the first light source 10a. The third light source 30a having these characteristics may be a natural LED. The natural LED is a light emitting diode that emits light of a spectrum similar to sunlight, and the light from the third light source 30a may have a spectral distribution as illustrated in FIG. 4. For example, the X-axis of FIG. 4 represents a wavelength of light, and the Y-axis of FIG. 4 represents a light intensity. The light from the third light source 30a may have a spectral distribution as illustrated in FIG. 4. The maximum light intensity from the third light source 30a in the blue wavelength region is smaller than the maximum light intensity from the first light source 10a in the blue wavelength region. Here, the spectral distribution of FIG. 4 illustrates the spectral distribution of the third light source 30a at a color temperature of 3803K. The third light source 30a may be, for example, a Sunlike light emitting diode (LED) manufactured by Seoul Semiconductor Corporation.

The natural LED (e.g., a Sunlike LED) may have a lower light intensity than the white LED used as the first light source 10a in the blue light wavelength region. For example, when the white LED used as the first light source 10a in the blue light wavelength region has a light intensity of 136 mW, the Sunlike LED may have a light intensity of 24 mW in the blue light wavelength region. Meanwhile, the Sunlike LED may have a higher light intensity than the solar spectrum in the blue peak wavelength region of 450 nm.

In addition, the Sunlike LED may have a closer match rate to the solar spectrum than the white LED used as the first light source 10a. For example, as described above, when the white LED used as the first light source 10a represents a match rate of 72% with a solar spectrum at a color temperature of 2700K, represents a match rate of 71% with a solar spectrum at 3000K color temperature, represents a match rate of 72% with a solar spectrum at a color temperature of 4000K, represents a match rate of 72% with a solar spectrum at a color temperature of 5000K, and represents a match rate of 73% with a solar spectrum at a color temperature of 6500K, the Sunlike LED may represent a match rate of 92% with the solar spectrum at the color temperature of 2700K, represent a match rate of 90% with the solar spectrum at a color temperature of 3000K, represent a match rate of 92% with the solar spectrum at the color temperature of 4000K, represent a match rate of 93% with the solar spectrum at the color temperature of 5000K, and represent a match rate of 94% with the solar spectrum at the color temperature of 6500K.

In addition, the Sunlike LED may have a lower light efficiency than the white LED used as the first light source 10a. For example, when the white LED as the first light source 10a has light efficiency of 105 lm/W, the Sunlike LED may have light efficiency of 57.3 lm/W.

When the third light source module 30 includes the plurality of third light sources 30a, the plurality of third light sources 30a are arranged along the second side surface 103 of the light guide plate 100. For example, the plurality of first light sources 30a are arranged along the Y-axis direction while facing the first side surface 103 of the light guide plate 100.

One surface of the third light source circuit board 30b may be divided into at least one mounting area and a wiring area. When the third light source module 30 includes the plurality of third light sources 30a, one third light source 30a may be arranged in each mounting area, and a plurality of power supply lines for transmitting power to the third light sources 30a may be arranged in the wiring area.

The light from the third light source 30a is incident on the third side surface 103 of the light guide plate 100. The light incident on the third side surface 103 may be totally reflected by the light guide pattern and proceed to the fourth side surface 104 of the light guide plate 100. In this case, the light incident on the third side surface 103 of the light guide plate 100 proceeds to the diffusion plate 600 through the lower surface 100a of the light guide plate 100.

The fourth light source module 40 may include a fourth light source circuit board 40b and at least one fourth light source 40a mounted on the fourth light source circuit board 40b. A light exit surface of the fourth light source 40a faces the fourth side surface 104 of the light guide plate 100.

The fourth light source 40a generates light. The fourth light source 40a may be different types of light sources from the first light source 10a. For example, the fourth light source 40a may be the same natural LED as the third light source 30a described above. As a specific example, the fourth light source 40a may be the above-described Sunlike LED.

When the fourth light source module 40 includes the plurality of fourth light sources 40a, the plurality of fourth light sources 40a are arranged along the fourth side surface 104 of the light guide plate 100. For example, the plurality of fourth light sources 40a are arranged along the X-axis direction while facing the fourth side surface 104 of the light guide plate 100.

One surface of the fourth light source circuit board 40b may be divided into at least one mounting area and a wiring area. When the fourth light source module 40 includes the plurality of fourth light sources 40a, one fourth light source 40a may be arranged in each mounting area, and the plurality of power supply lines for transmitting power to the fourth light sources 40a may be arranged in the wiring area.

The light from the fourth light source 40a is incident on the fourth side surface 104 of the light guide plate 100. The light incident on the fourth side surface 104 may be totally reflected by the light guide pattern and proceed to the third side surface 103 of the light guide plate 100. In this case, the light incident on the fourth side surface 104 of the light guide plate 100 proceeds to the diffusion plate 600 through the lower surface 100a of the light guide plate 100.

As illustrated in FIG. 2, the diffusion plate 600 may be disposed under the light guide plate 100. In other words, the diffusion plate 600 may be disposed to face the lower surface 100a of the light guide plate 100. The diffusion plate 600 disperses light transmitted from the light guide plate 100 to prevent the light from being partially concentrated.

Meanwhile, although not illustrated, a light collecting plate may be further disposed under the diffusion plate 600. The light collecting plate serves to condense light diffused from the diffusion plate 600. To this end, triangular prisms may be disposed in a certain arrangement on one surface of the light collecting plate.

In addition, although not illustrated, a protective plate may be further disposed under the light collecting plate. The protective plate protects the surface of the light collecting plate, and diffuses light to make the light distribution uniform. Meanwhile, a double brightness enhancement film may be used instead of the above-described protective plate.

As illustrated in FIG. 2, the reflective sheet 400 may be disposed between the base part 222 of the cover part 200 and the upper surface 100b of the light guide plate 100. The reflective sheet 400 may increase light efficiency. The light emitted from the first to fourth light sources 10a, 20a, 30a, and 40a and incident on the reflective sheet 400 through the upper surface 100b of the light guide plate 100 may be reflected by the reflective sheet 400. The light reflected by the reflective sheet 400 may be incident on the diffusion plate 600 through the lower surface 100b of the light guide plate 100.

As illustrated in FIG. 2, the support part 500 supports the cover part 200. In addition, the support part 500 includes the first to fourth light source modules 10, 20, 30, and 40, the reflective sheet 400, the light guide plate 100, and the diffusion plate 600 that are disposed in the storage space of the cover part 200. To this end, the support part 500 may include a support frame 555, a first support part 501, a second support part 502, and a third support part 503.

The first support part 501 protrudes from one end portion of the support frame 555 toward the diffusion plate 600. The first support part 501 supports the diffusion plate 600.

The second support part 502 protrudes from the first support part 501 along the Z-axis direction. The second support part 502 supports the first to fourth side portions 201, 202, 203, and 204 of the cover part 200.

The third support part 503 may be fixed to the support frame 555 through a fastening means 550. The third support part 503 supports the base part 222 of the cover part 200.

The power supply unit 300 may supply power (e.g., at least one of voltage and current) to each light source module. For example, the power supply unit 300 may supply power to the first light source module 10, the second light source module 20, the third light source module 30, and the fourth light source module 40. The power supply unit 300 may be arranged on the base part 222 of the cover part 200.

The lighting device of the present disclosure may control power (e.g., power consumption) of light source modules including different types of light sources to have different values. For example, the lighting device of the present disclosure may control the power supply unit 300 so that the power consumption of the light source module including different types of light sources has different values. In other words, the power consumption of the light source module including different types of light sources may be different. For example, the power consumption of the first light source module 10 including the first light source 10a which is the white LED and the power consumption of the third light source module 30 including the third light source 30a which is the natural LED (e.g., Sunlike LED) may be different from each other. For example, a ratio of the power consumption of the first light source 10a and the power consumption of the third light source 30a may be 1:n, where n may be greater than 1 (e.g., n may be a positive rational number greater than 1). As an example, n may have a size between 3.8 and 4.5 (e.g., n may be a rational number with a size between 3.8 and 4.5). For example, when the first light source module 10 and the third light source module 30 each include only one light source, and when n is 4, the power consumption of the first light source 10a included in the first light source module 10 may be 10 W, and the power consumption of the third light source 30a included in the third light source module 30 may be 40 W.

Meanwhile, the first light source module 10 includes at least two or more of the first light source 10a which is the above-described white LED, and the third light source module 30 includes at least two third light sources 30a which is the above-described natural LED. In this case, a ratio of the total power consumption of all the first light sources 10a included in the first light source module 10 and the total power consumption of all the third light sources 30a included in the third light source module 30 may be 1:n. Here, n may be greater than 1 as described above. As an example, n may have a size of 3.8 to 4.5. For example, when n is 4, the total power consumption obtained by summing all individual power consumptions of each of all the first light sources 10a included in the first light source module 10 may be 10 W, and the total power consumption obtained by summing all individual power consumptions of each of all the third light sources 10a included in the third light source module 10 may be 40 W. In this case, the individual power consumptions of each of the first and third light sources 10a and 30a may be equal to or different from each other according to the magnitude of the current and voltage applied to each of the first light sources 10a and the third light sources 30a.

The power supply unit 300 may include a converter that supplies power to the first light source module 10, the second light source module 20, the third light source module 30, and the fourth light source module 40. In this case, the power supply unit 300 may supply power including a voltage of 36V.

For example, the power consumption of the second light source module 20 including the second light source 20*a* which is the white LED and the power consumption of the fourth light source module 40 including the fourth light source 40*a* which is the natural LED (e.g., Sunlike LED) may be different from each other. As a specific example, a ratio of the power consumption of the second light source module 20 and the power consumption of the fourth light source module 40 may be 1:n. As a more specific example, when the total power consumption of all the second light sources 20*a* included in the second light source module 20 is 10 W, the total power of all the fourth light sources 40*a* included in the fourth light source module 40 may be 40 W.

In this way, when power is applied to the first and second light source modules 10 and 20 including the white LED to generate power consumption of 10 W and power is applied to the third and fourth light source modules 30 and 40 including the natural LED to generate power consumption of 40 W, the light intensity in the blue light region of the light generated by the combination of the first to fourth light sources 10*a*, 20*a*, 30*a*, and 40*a* may decrease more than the light intensity in the blue light region of the light from the white LED, but the light efficiency in the blue light region may increase more than the light efficiency in the blue light region of the light from the white LED.

Figure 5:
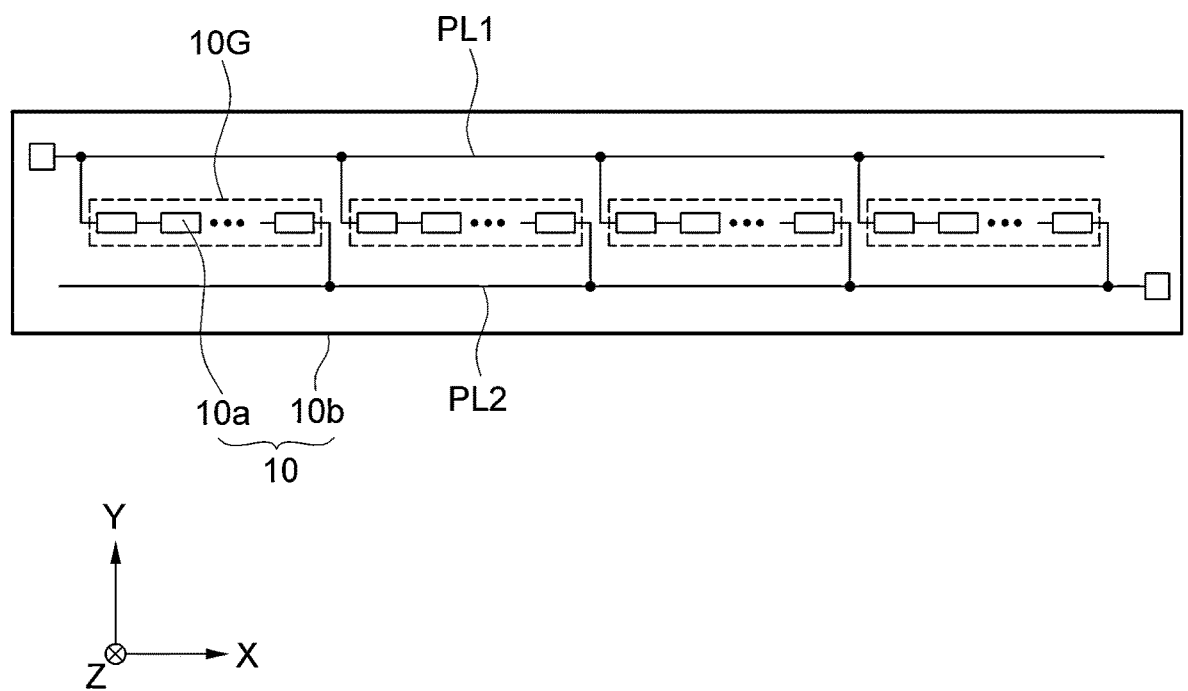
FIG. 5 is a diagram for describing a circuit configuration of a first light source module of FIG. 1.
Figure 6:
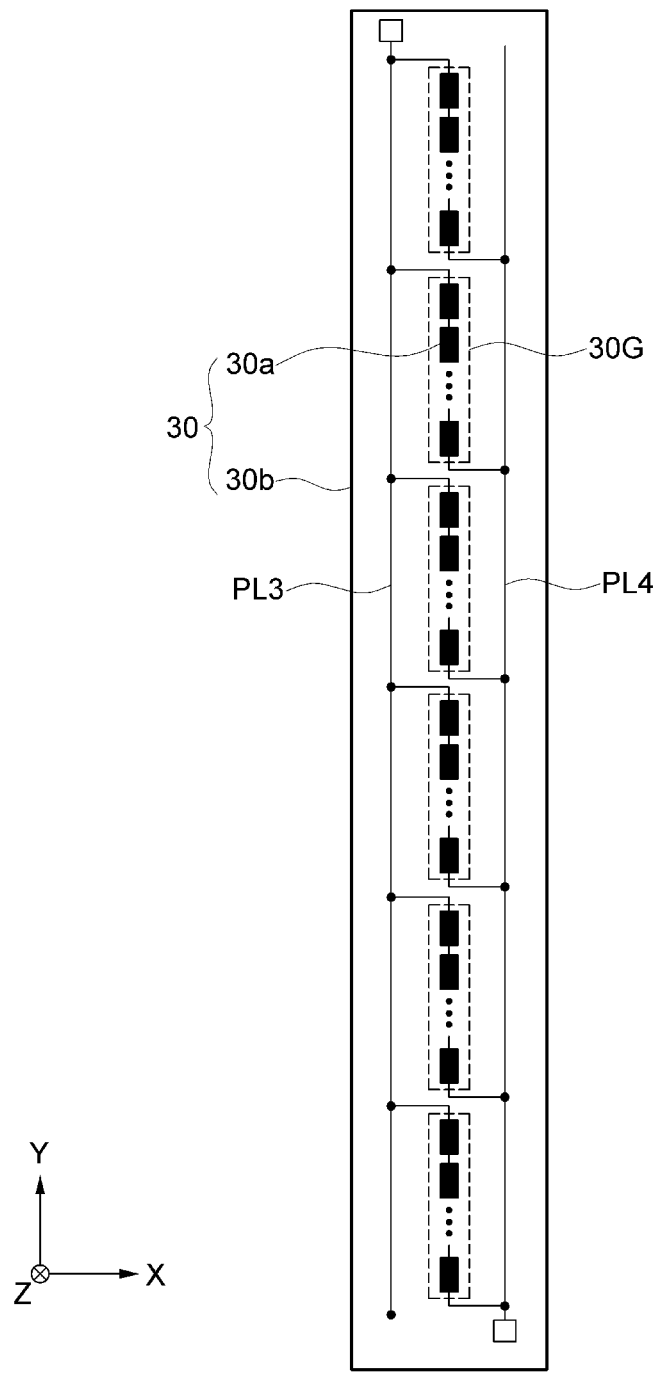
FIG. 6 is a diagram for describing a circuit configuration of a second light source module of FIG. 1.

FIG. 5 is a diagram for describing the circuit configuration of the first light source module 10 of FIG. 1, and FIG. 6 is a diagram for describing the circuit configuration of the second light source module 20 of FIG. 1.

As in the example illustrated in FIG. 5, the first light source module 10 may include 48 first light sources 10*a*. In this case, 12 adjacent first light sources 10*a* may be connected in series between a first power supply line PL1 and a second power supply line PL2. When 12 light sources connected in series with each other are defined as a first light source group 10G, each first light source group 10G is connected in parallel between the first power supply line PL1 and the second power supply line PL2. In the example illustrated in FIG. 5, the total number of first light source groups 10G may be four. Here, the power output from the above-described power supply unit 300 may be supplied to the first power supply line PL1 and the second power supply line PL2.

The second light source module 20 may have the same circuit configuration as the first light source module 10 of FIG. 5. For example, the second light source module 20 may include 48 second light sources 20*a*. In this case, 12 adjacent second light sources 20*a* may be connected in series between a first power supply line PL1 and a second power supply line PL2. When the 12 light sources connected in series with each other are defined as the second light source group, each second light source group may be connected in parallel between the first power supply line PL1 and the second power supply line PL2. The total number of second light source groups may be four.

As in the example illustrated in FIG. 6, the third light source module 30 may include 192 third light sources 30*a*. In this case, 32 adjacent third light sources 30*a* may be connected in series between a third power supply line PL3 and a fourth power supply line PL4. When 32 third light sources connected in series with each other are defined as a third light source group 30G, each third light source group 30G is connected in parallel between the third power supply line PL3 and the fourth power supply line PL4. In the example illustrated in FIG. 6, the total number of third light source groups 10G may be six. Here, the power output from the above-described power supply unit 300 may be supplied to the third power supply line PL3 and the fourth power supply line PL4.

The fourth light source module 40 may have the same circuit configuration as the third light source module 30 of FIG. 6. For example, the fourth light source module 40 may include 192 fourth light sources 40*a*. In this case, 32 adjacent fourth light sources 40*a* may be connected in series between the third power supply line PL3 and the fourth power supply line PL4. When 32 fourth light sources 40*a* connected in series with each other are defined as the fourth light source group, each fourth light source group is connected in parallel between the third power supply line PL3 and the fourth power supply line PL4. The total number of fourth light source groups may be six.

Here, as illustrated in FIG. 1, when 48 first light sources 10*a* included in the first light source module 10 are arranged along the first side surface 101 of the light guide plate 100, 48 second light sources 20*a* included in the second light source module 20 are arranged along the second side surface 102 of the light guide plate 100, 192 third light sources 30*a* included in the third light source module 30 are arranged along the third side surface 103 of the light guide plate 100, 192 fourth light sources 40*a* included in the fourth light source module 40 are arranged along the fourth side surface 104 of the light guide plate 100, the total power consumption of 48 first light sources 10*a* included in the first light source module 10 is 10 W, the total power consumption of 48 second light sources 20*a* included in the second light source module 20 is 10 W, the total power consumption of 192 third light sources 30*a* included in the third light source module 30 is 40 W, the total power consumption of 192 fourth light sources 40*a* included in the fourth light source module 40 is 40 W, 48 first light sources 10*a* and 48 second light sources 20*a* each are the above-described white LEDs, and 192 third light sources 30*a* and 192 fourth light sources 40*a* each are the above-described natural LEDs (e.g., Sunlike LEDs), the light intensity in the blue light wavelength region of the light (i.e., mixed light) generated by the combination of 480 light sources 10*a*, 20*a*, 30*a*, and 40*a* may be 100 mW and the light efficiency of the light generated by 264 light sources 10*a*, 20*a*, 30*a*, and 40*a* may be 117,221 lm/W.

Therefore, the light intensity in the blue light wavelength region of the light generated from the lighting device of the present disclosure having the structure (structure in which the white LED and the natural LED are used together, and the ratio of the power consumption of the white LED and the power consumption of the natural LED is about 1:4) of FIG. 1 may be reduced by about 36% compared to the light intensity in the blue light wavelength region of the light from the lighting device including only the white LEDs. In addition, the light efficiency of the light generated from the lighting device of the present disclosure having the structure of FIG. 1 may far exceed 100 lm/W which is the reference light efficiency of the high-efficiency lighting device. Accordingly, the lighting device having FIG. 1 of the present disclosure can sufficiently satisfy the reference light efficiency of the high-efficiency lighting device while emitting a smaller amount of blue light (i.e., blue light) than the lighting device using only the white LED.

Figure 7:
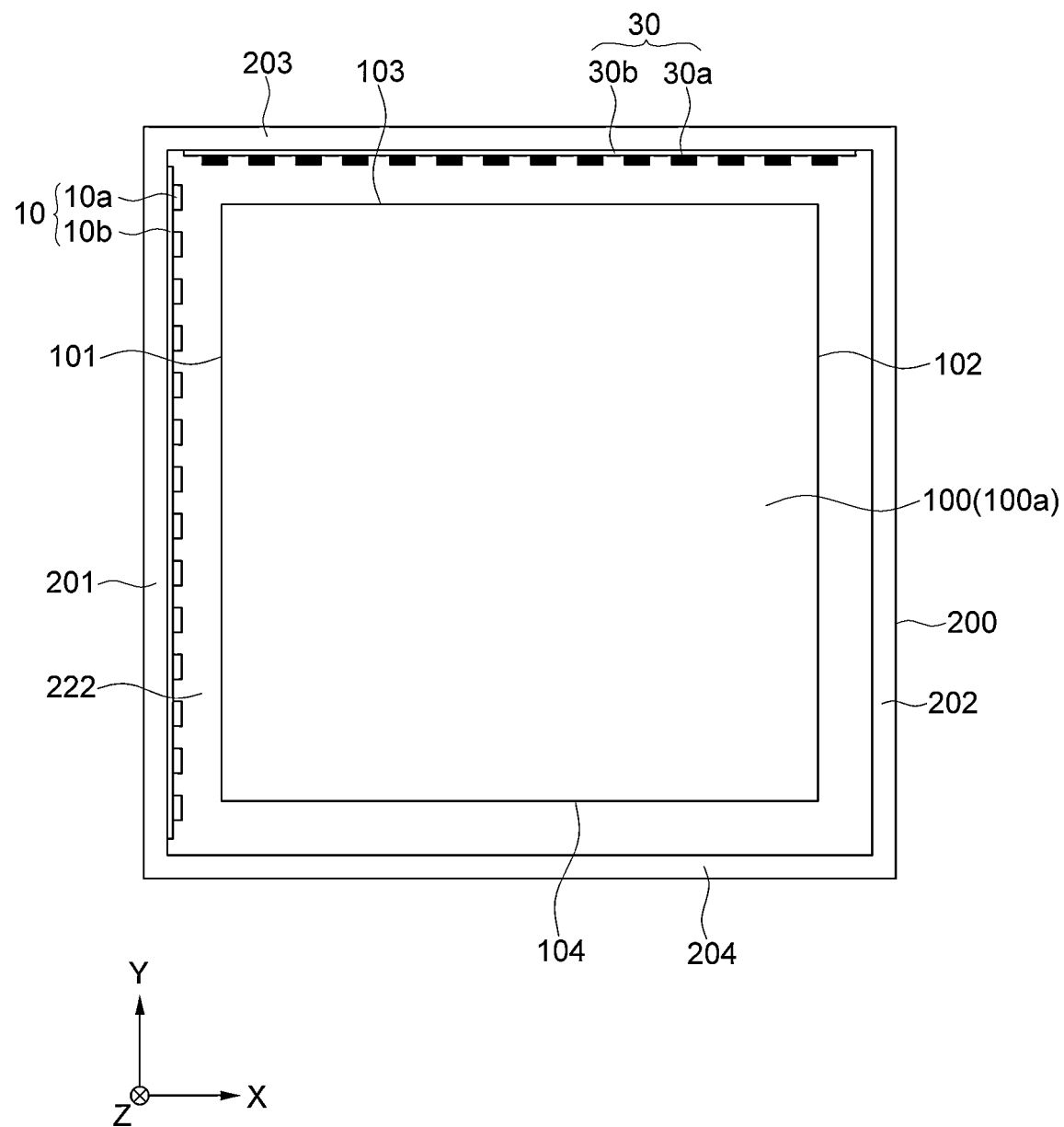
FIG. 7 is a plan view of a lighting device according to another embodiment of the present disclosure.

FIG. 7 is a plan view of a lighting device according to another embodiment of the present disclosure.

According to the lighting device of the present disclosure having the structure of FIG. 7, the first light sources 10*a* of the first light source module 10 are arranged along the first side surface 101 of the light guide plate 100, and the third light sources 30a of the third light source module 30 may be arranged along the third side surface 103 of the light guide plate 100.

The first light sources 10a of the first light source module 10 may each be the above-described white LED, and the third light sources 30a of the third light source module 30 may each be the above-described natural LED (e.g., Sunlike LED).

In addition, the ratio of the power consumption of the first light source module 10 and the power consumption of the third light source module 30 may be 1:n (e.g., 1:4) as described above. As a more specific example, the total power consumption of the first light sources 10a of the first light source module 10 may be 10 W, and the total power consumption of the third light sources 30a of the third light source module 30 may be 40 W.

The lighting device of the present disclosure having the structure (a structure in which the white LED and the natural light LED are mixed, and the ratio of the power consumption of the white LED and the power consumption of the natural LED is about 1:4) of FIG. 7 may sufficiently satisfy the reference light efficiency of the high-efficiency lighting device while emitting a smaller amount of blue light than the lighting device using only the white LED.

Meanwhile, since the remaining components of FIG. 7 are the same as the above-described components of FIGS. 1 and 2, the descriptions of the remaining components not described in FIG. 7 refer to FIGS. 1 and 2 and related descriptions.

Figure 8:
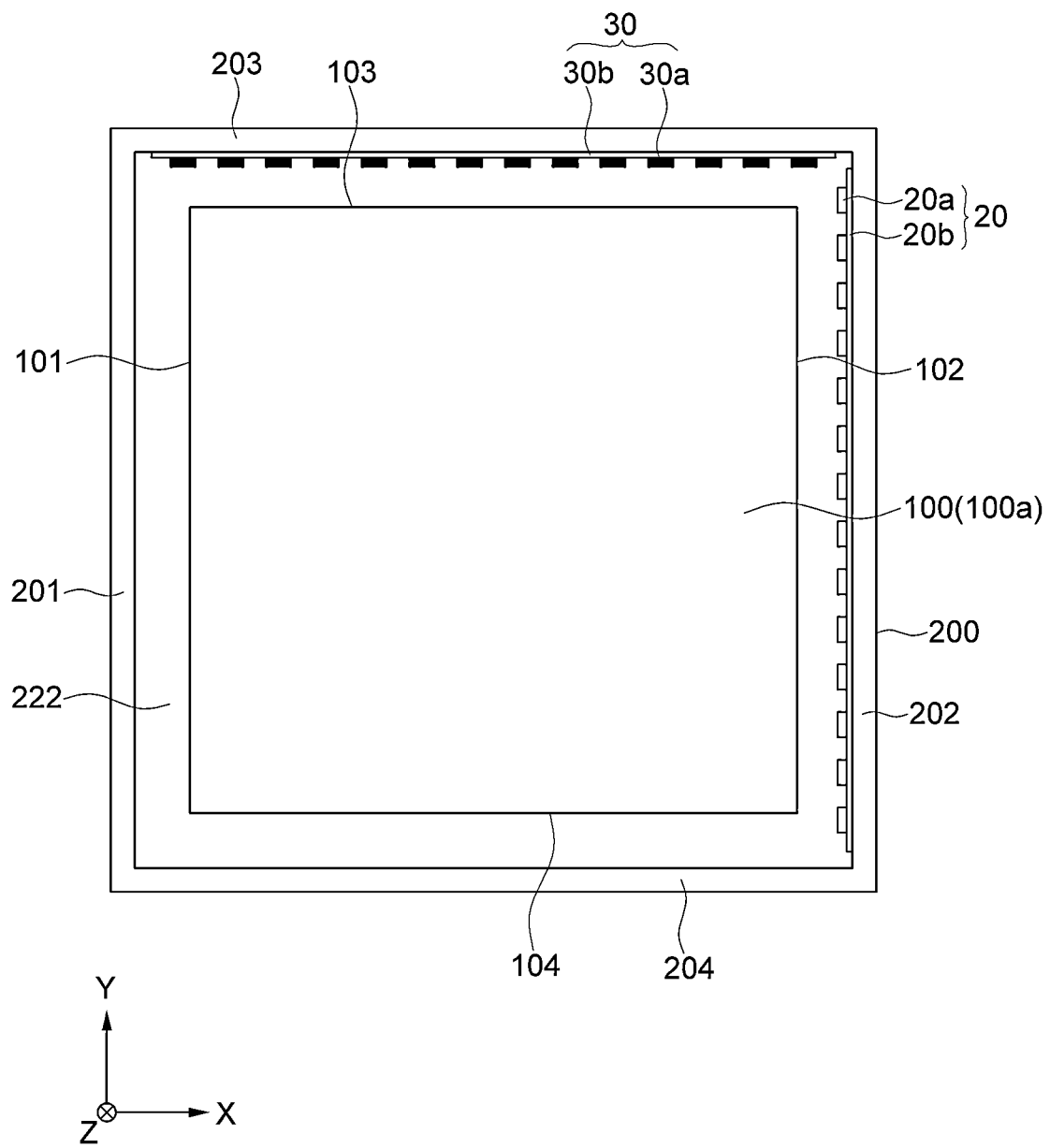
FIG. 8 is a plan view of a lighting device according to another embodiment of the present disclosure.

FIG. 8 is a plan view of a lighting device according to another embodiment of the present disclosure.

According to the lighting device of the present disclosure having the structure of FIG. 8, the second light sources 20a of the second light source module 20 are arranged along the first side surface 102 of the light guide plate 100, and the third light sources 30a of the third light source module 30 may be arranged along the third side surface 103 of the light guide plate 100.

The second light sources 20a of the second light source module 20 may each be the above-described white LED, and the third light sources 30a of the third light source module 30 may each be the above-described natural LED (e.g., Sunlike LED).

In addition, the ratio of the power consumption of the first light source module 20 and the power consumption of the third light source module 30 may be 1:n (e.g., 1:4) as described above. As a more specific example, the total power consumption of the second light sources 20a of the second light source module 20 may be 10 W, and the total power consumption of the third light sources 30a of the third light source module 30 may be 40 W.

The lighting device of the present disclosure having the structure (a structure in which the white LED and the natural light LED are mixed, and the ratio of the power consumption of the white LED and the power consumption of the natural LED is about 1:4) of FIG. 8 may sufficiently satisfy the reference light efficiency of the high-efficiency lighting device while emitting a smaller amount of blue light than the lighting device using only the white LED.

Meanwhile, since the remaining components of FIG. 8 are the same as the above-described components of FIGS. 1 and 2, the descriptions of the remaining components not described in FIG. 8 refer to FIGS. 1 and 2 and related descriptions.

Figure 9:
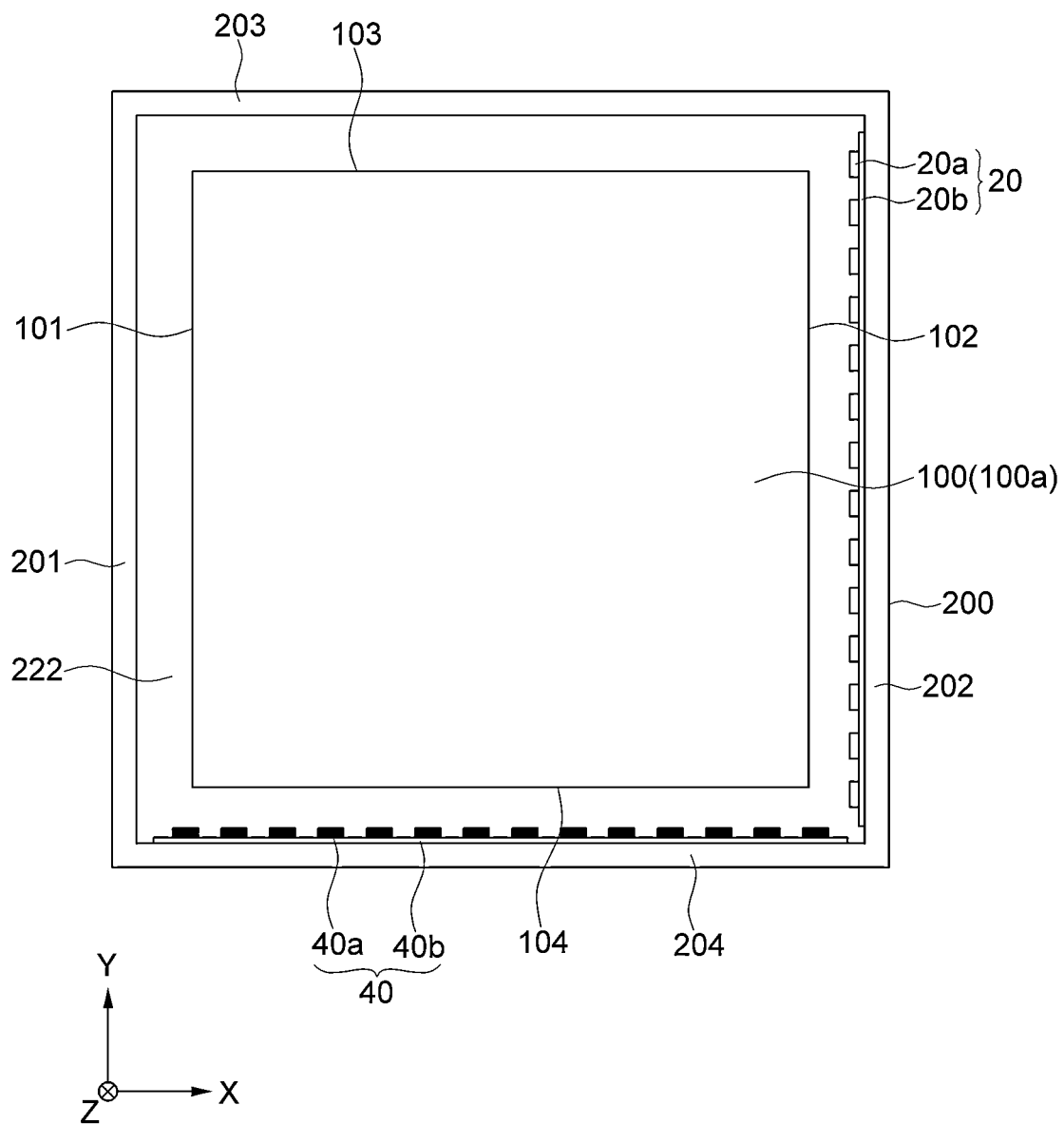
FIG. 9 is a plan view of a lighting device according to another embodiment of the present disclosure.

FIG. 9 is a plan view of a lighting device according to another embodiment of the present disclosure.

According to the lighting device of the present disclosure having the structure of FIG. 9, the second light sources 20a of the second light source module 20 are arranged along the first side surface 102 of the light guide plate 100, and the fourth light sources 40a of the fourth light source module 40 may be arranged along the fourth side surface 104 of the light guide plate 100.

The second light sources 20a of the second light source module 20 may each be the above-described white LED, and the fourth light sources 40a of the fourth light source module 40 may each be the above-described natural LED (e.g., Sunlike LED).

In addition, the ratio of the power consumption of the first light source module 20 and the power consumption of the fourth light source module 40 may be 1:n (e.g., 1:4) as described above. As a more specific example, the total power consumption of the second light sources 20a of the second light source module 20 may be 10 W, and the total power consumption of the fourth light sources 40a of the fourth light source module 40 may be 40 W.

The lighting device of the present disclosure having the structure (a structure in which the white LED and the natural light LED are mixed, and the ratio of the power consumption of the white LED and the power consumption of the natural LED is about 1:4) of FIG. 9 may sufficiently satisfy the reference light efficiency of the high-efficiency lighting device while emitting a smaller amount of blue light than the lighting device using only the white LED.

Meanwhile, since the remaining components of FIG. 9 are the same as the above-described components of FIGS. 1 and 2, the descriptions of the remaining components not described in FIG. 9 refer to FIGS. 1 and 2 and related descriptions.

Figure 10:
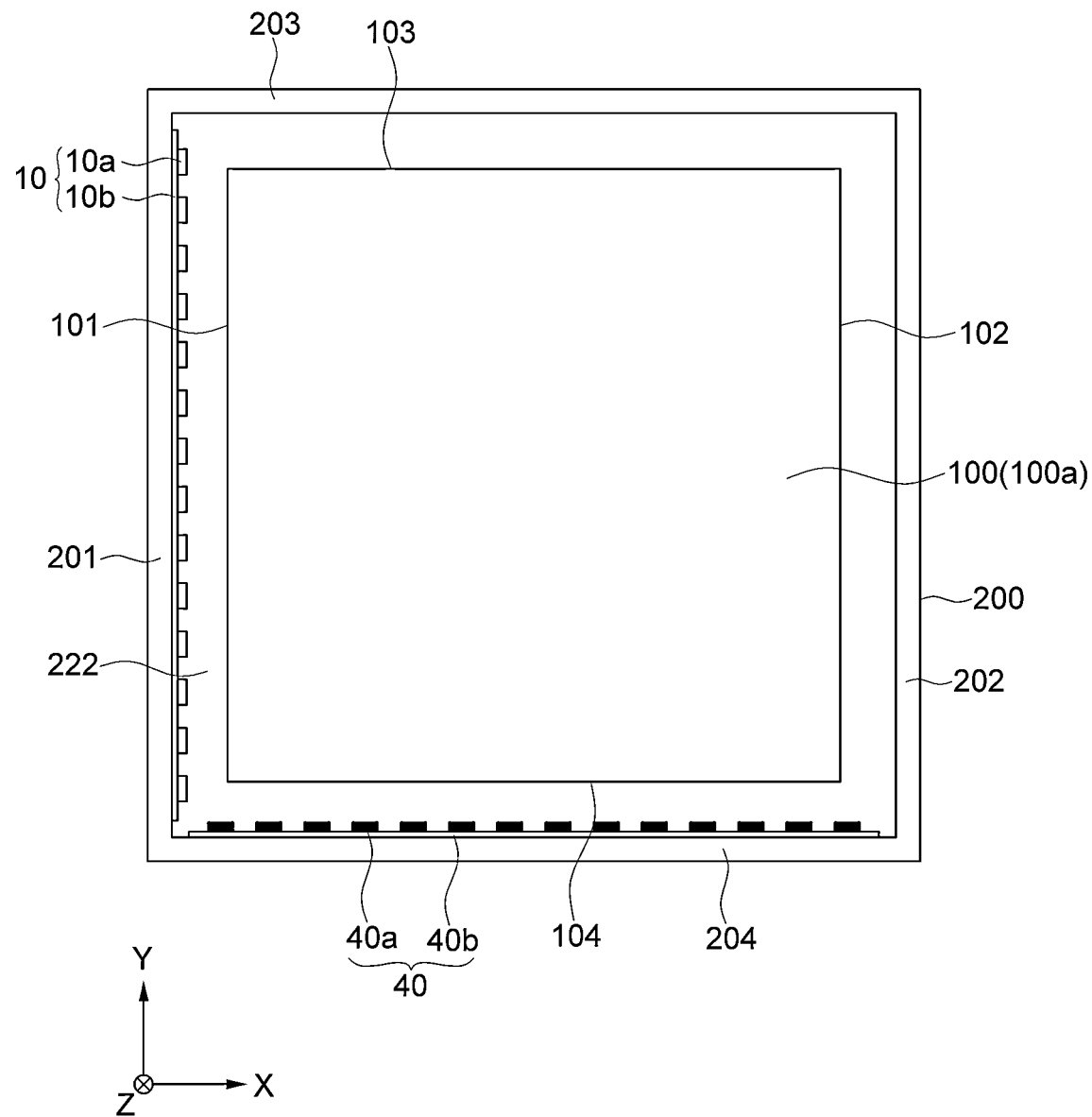
FIG. 10 is a plan view of a lighting device according to another embodiment of the present disclosure.

FIG. 10 is a plan view of a lighting device according to another embodiment of the present disclosure.

According to the lighting device of the present disclosure having the structure of FIG. 10, the first light sources 10a of the first light source module 10 are arranged along the first side surface 101 of the light guide plate 100, and the fourth light sources 40a of the fourth light source module 40 may be arranged along the fourth side surface 104 of the light guide plate 100.

The first light sources 10a of the first light source module 10 may each be the above-described white LED, and the fourth light sources 40a of the fourth light source module 40 may each be the above-described natural LED (e.g., Sunlike LED).

In addition, the ratio of the power consumption of the first light source module 10 and the power consumption of the fourth light source module 40 may be 1:n (e.g., 1:4) as described above. As a more specific example, the total power consumption of the first light sources 10a of the first light source module 10 may be 10 W, and the total power consumption of the fourth light sources 40a of the fourth light source module 40 may be 40 W.

The lighting device of the present disclosure having the structure (a structure in which the white LED and the natural light LED are mixed, and the ratio of the power consumption of the white LED and the power consumption of the natural LED is about 1:4) of FIG. 10 may sufficiently satisfy the reference light efficiency of the high-efficiency lighting device while emitting a smaller amount of blue light than the lighting device using only the white LED.

Meanwhile, since the remaining components of FIG. 10 are the same as the above-described components of FIGS. 1 and 2, the descriptions of the remaining components not described in FIG. 10 refer to FIGS. 1 and 2 and related descriptions.

Figure 11:
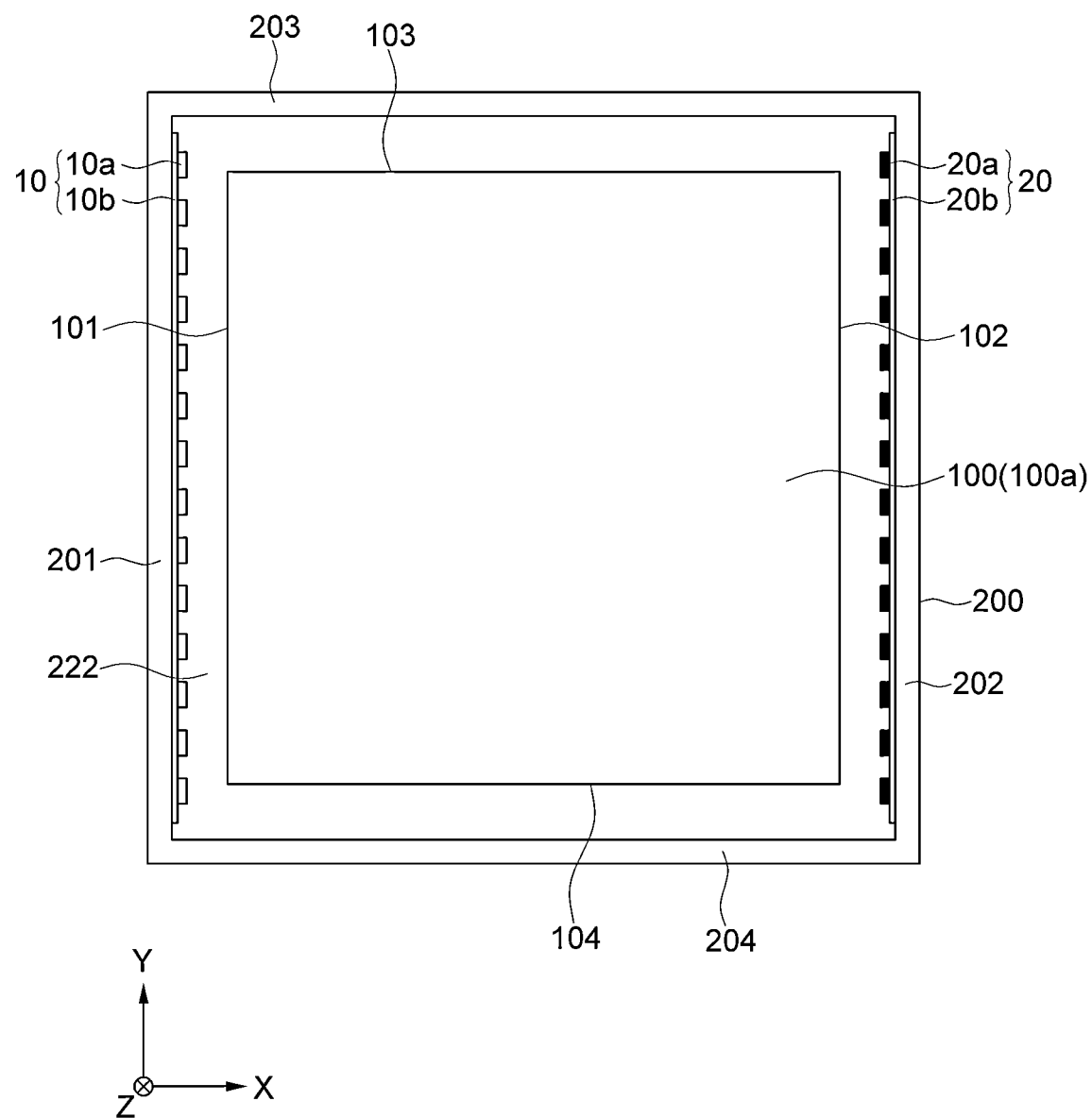
FIG. 11 is a plan view of a lighting device according to another embodiment of the present disclosure.

FIG. 11 is a plan view of a lighting device according to another embodiment of the present disclosure.

According to the lighting device of the present disclosure having the structure of FIG. 11, the first light sources 10*a* of the first light source module 10 are arranged along the first side surface 101 of the light guide plate 100, and the second light sources 20*a* of the second light source module 20 may be arranged along the second side surface 102 of the light guide plate 100.

The first light sources 10*a* of the first light source module 10 may each be the above-described white LED, and the second light sources 20*a* of the second light source module 20 may each be the above-described natural LED (e.g., Sunlike LED).

In addition, the ratio of the power consumption of the first light source module 10 and the power consumption of the second light source module 20 may be 1:n (e.g., 1:4) as described above. As a more specific example, the total power consumption of the first light sources 10*a* of the first light source module 10 may be 10 W, and the total power consumption of the second light sources 20*a* of the second light source module 20 may be 40 W.

The lighting device of the present disclosure having the structure (a structure in which the white LED and the natural light LED are mixed, and the ratio of the power consumption of the white LED and the power consumption of the natural LED is about 1:4) of FIG. 11 may sufficiently satisfy the reference light efficiency of the high-efficiency lighting device while emitting a smaller amount of blue light than the lighting device using only the white LED.

Meanwhile, since the remaining components of FIG. 11 are the same as the above-described components of FIGS. 1 and 2, the descriptions of the remaining components not described in FIG. 11 refer to FIGS. 1 and 2 and related descriptions.

On the other hand, although not illustrated, in FIG. 11, the second light sources 20*a* of the second light source module 20 may each be the above-described white LED, and the first light sources 10*a* of the first light source module 10 may each be the above-described natural LED (e.g., Sunlike LED). In this case, the ratio of the power consumption of the second light source module 20 and the power consumption of the first light source module 10 may be 1:n (e.g., 1:4) as described above.

Figure 12:
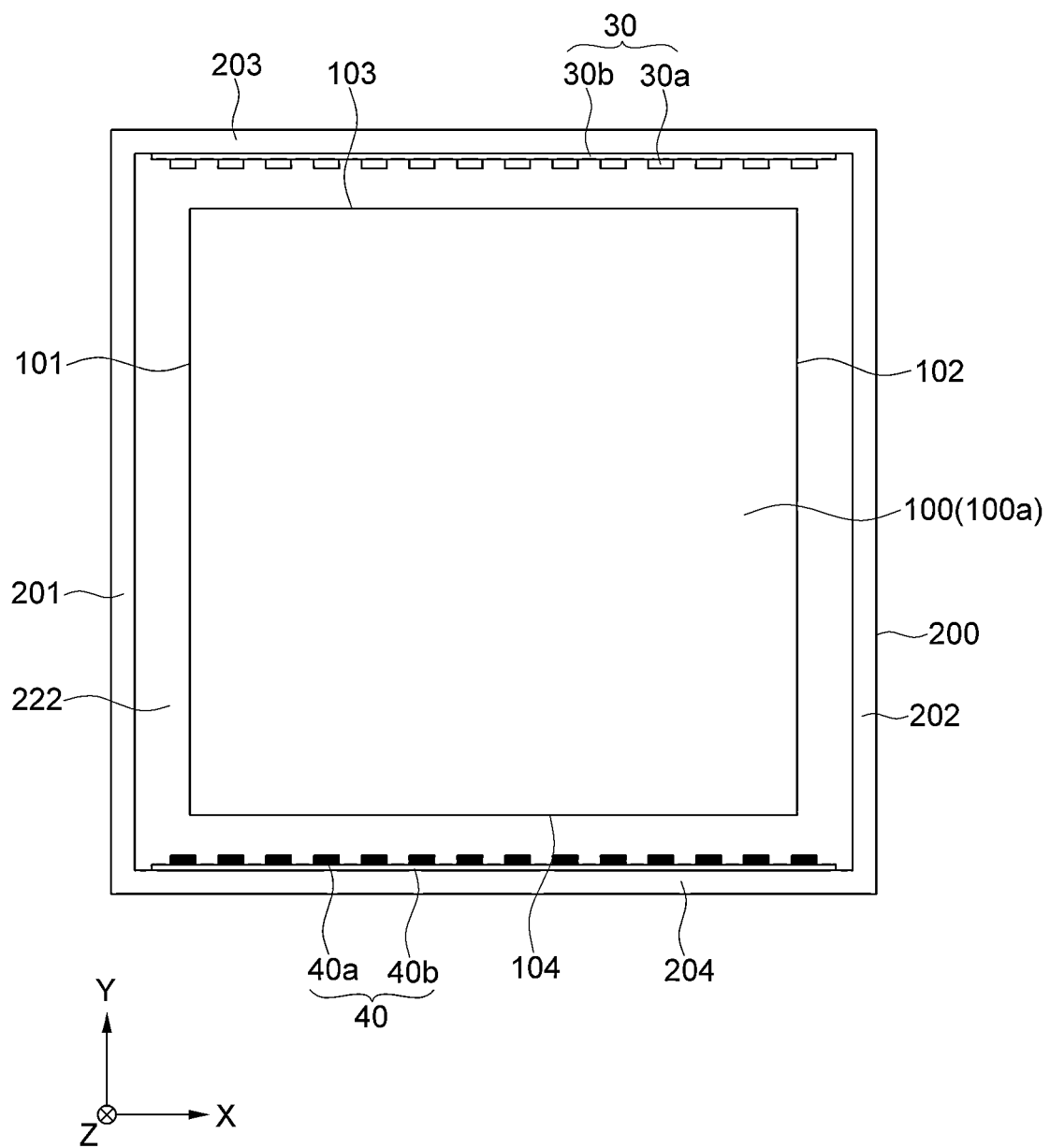
FIG. 12 is a plan view of a lighting device according to another embodiment of the present disclosure.

FIG. 12 is a plan view of a lighting device according to another embodiment of the present disclosure.

According to the lighting device of the present disclosure having the structure of FIG. 12, the third light sources 30*a* of the third light source module 30 are arranged along the third side surface 103 of the light guide plate 100, and the fourth light sources 40*a* of the fourth light source module 40 may be arranged along the fourth side surface 104 of the light guide plate 100.

The third light sources 30*a* of the third light source module 30 may each be the above-described white LED, and the fourth light sources 40*a* of the fourth light source module 40 may each be the above-described natural LED (e.g., Sunlike LED).

In addition, the ratio of the power consumption of the first light source module 30 and the power consumption of the fourth light source module 40 may be 1:n (e.g., 1:4) as described above. As a more specific example, the total power consumption of the third light sources 30*a* of the third light source module 30 may be 10 W, and the total power consumption of the fourth light sources 40*a* of the fourth light source module 40 may be 40 W.

The lighting device of the present disclosure having the structure (a structure in which the white LED and the natural light LED are mixed, and the ratio of the power consumption of the white LED and the power consumption of the natural LED is about 1:4) of FIG. 12 may sufficiently satisfy the reference light efficiency of the high-efficiency lighting device while emitting a smaller amount of blue light than the lighting device using only the white LED.

Meanwhile, since the remaining components of FIG. 12 are the same as the above-described components of FIGS. 1 and 2, the descriptions of the remaining components not described in FIG. 12 refer to FIGS. 1 and 2 and related descriptions.

On the other hand, although not illustrated, in FIG. 12, the fourth light sources 40*a* of the fourth light source module 40 may each be the above-described white LED, and the third light sources 30*a* of the third light source module 30 may each be the above-described natural LED (e.g., Sunlike LED). In this case, the ratio of the power consumption of the fourth light source module 40 and the power consumption of the third light source module 30 may be 1:n (e.g., 1:4) as described above.

Figure 13:
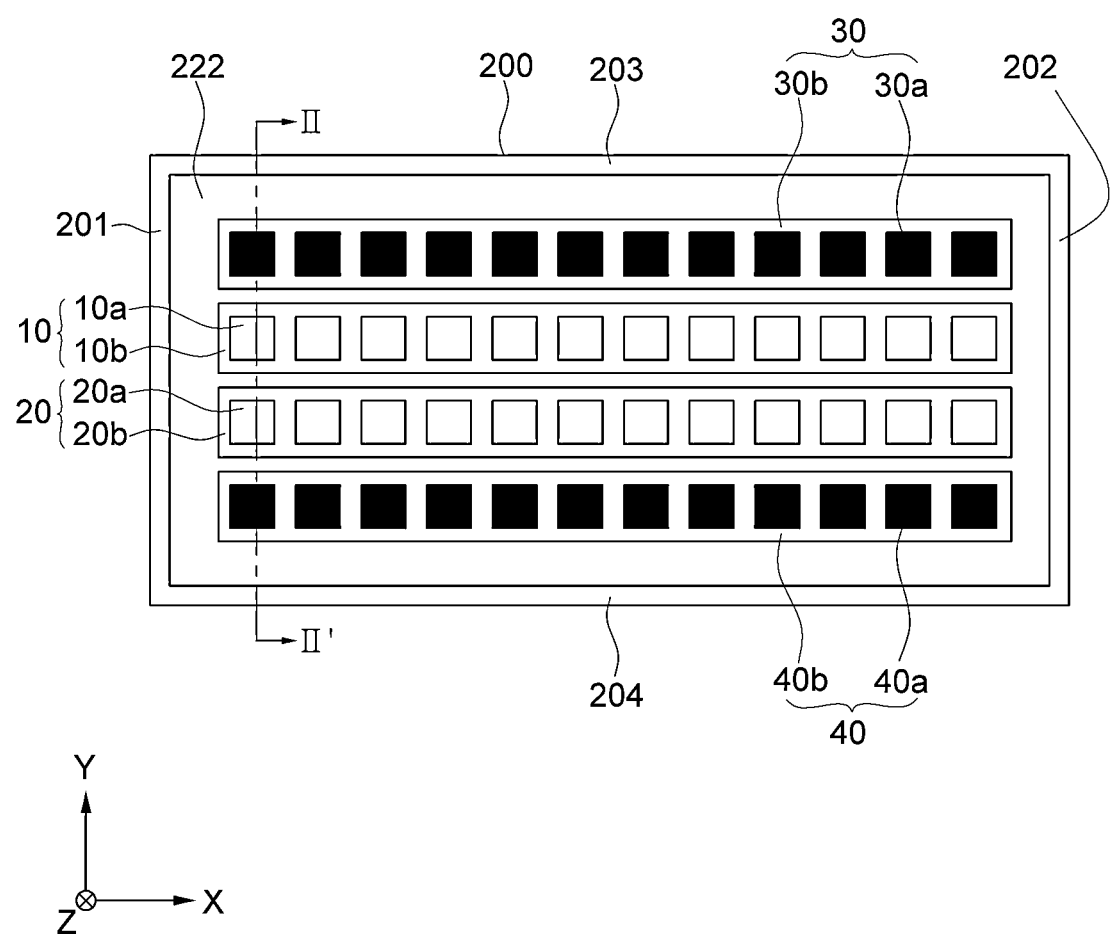
FIG. 13 is a plan view of a lighting device according to another embodiment of the present disclosure.
Figure 14:
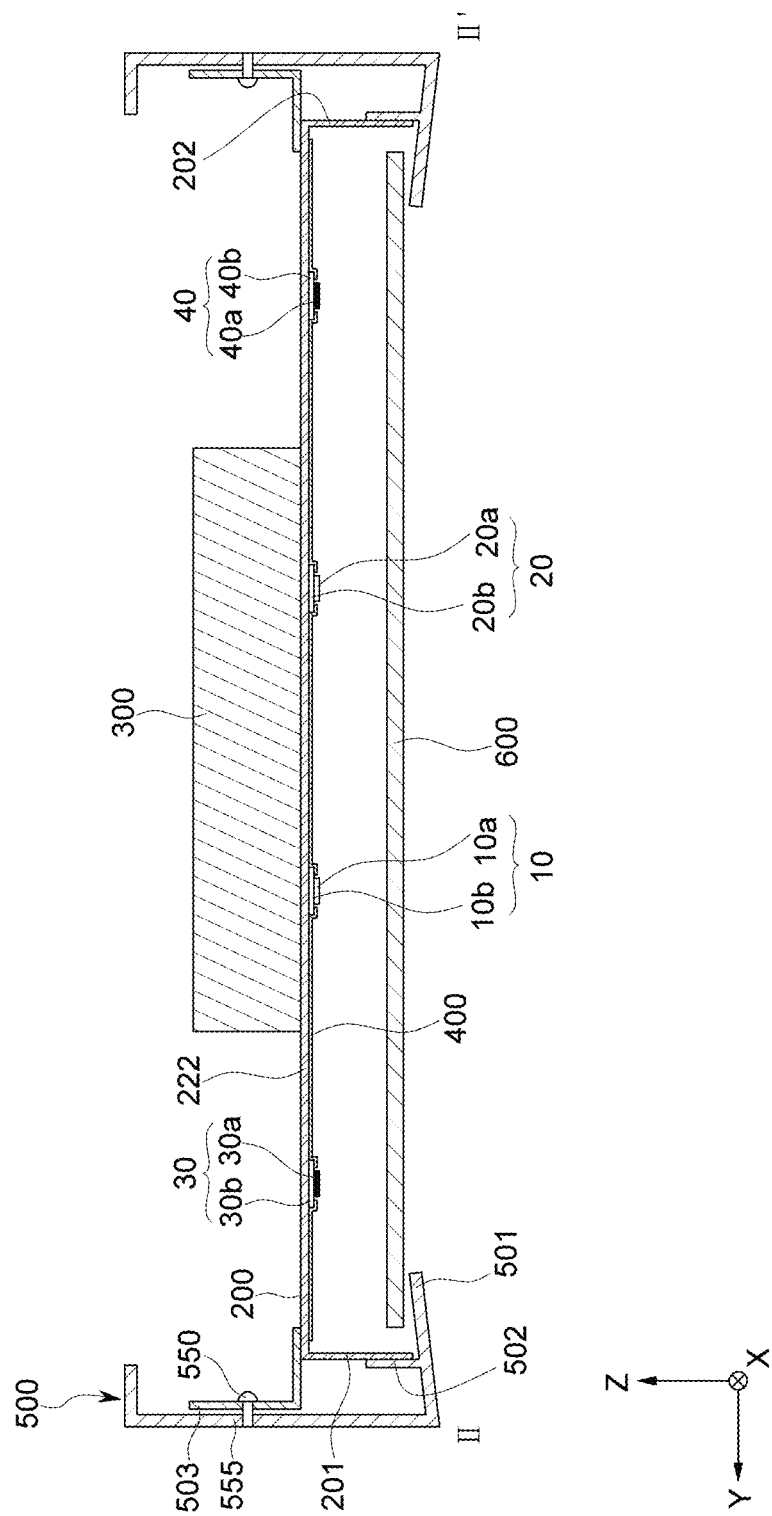
FIG. 14 is a cross-sectional view taken along line II-II' of FIG. 13.

FIG. 13 is a plan view of a lighting device according to another embodiment of the present disclosure, and FIG. 14 is a cross-sectional view taken along line II-II' of FIG. 13.

The lighting device of the present disclosure having the structure of FIGS. 13 and 14 may be a direct-type lighting device that does not include the light guide plate 100.

The lighting device of the present disclosure having the structure of FIG. 13 may include first to fourth light source modules 10, 20, 30, and 40 arranged on the base part 222 of the cover part 200.

The first light source module 10 may include the plurality of first light sources 10*a* and the first light source circuit board 10*b*, the second light source module 20 may include the plurality of second light sources 20*a* and the second light source circuit board 10*b*, the third light source module 30 may include the plurality of third light sources 30*a* and the third light source circuit board 30*b*, and the fourth light source module 40 may include the plurality of fourth light sources 40*a* and the fourth light source circuit board 40*b*.

The first light source module 10 and the second light source module 20 may be arranged between the third light source module 30 and the fourth light source module 40.

Each of the first light sources 10*a* of the first light source module 10 may each be the above-described white LED, the second light sources 20*a* of the second light source module 20 may each be the above-described white LED, the third light sources 30*a* of the third light source module 30 may each be the above-described natural LED (e.g., Sunlike LED), and the fourth light sources 40*a* of the fourth light source module 40 may each be the above-described natural LED (e.g., Sunlike LED).

The first light source module 10, the second light source module 20, the third light source module 30, and the fourth light source module 40 may be supplied with power from the power supply unit 300.

The ratio of the power consumption of the first light source module 10 and the power consumption of the third light source module 30 may be 1:n (e.g., 1:4) as described above. As a more specific example, the total power consumption of the first light sources 10*a* of the first light source module 10 may be 10 W, and the total power consumption of the third light sources 30*a* of the third light source module 30 may be 40 W.

The ratio of the power consumption of the second light source module 20 and the power consumption of the fourth light source module 40 may be 1:n (e.g., 1:4) as described above. As a more specific example, the total power consumption of the second light sources 20a of the second light source module 20 may be 10 W, and the total power consumption of the fourth light sources 40a of the fourth light source module 40 may be 40 W.

The lighting device of the present disclosure having the structure (a structure in which the white LED and the natural light LED are mixed, and the ratio of the power consumption of the white LED and the power consumption of the natural LED is about 1:4) of FIG. 13 may sufficiently satisfy the reference light efficiency of the high-efficiency lighting device while emitting a smaller amount of blue light than the lighting device using only the white LED.

Meanwhile, since the remaining components of FIG. 13 are the same as the above-described components of FIGS. 1 and 2, the descriptions of the remaining components not described in FIG. 12 refer to FIGS. 1 and 2 and related descriptions.

On the other hand, although not illustrated, in FIG. 13, the third light sources 30a of the third light source module 30 and the fourth light sources 40a of the fourth light source module 40 may each be the above-described white LED, and the first light sources 10a of the first light source module 10 and the second light sources 20a of the second light source module 20 may each be the above-described natural LED (e.g., Sunlike LED). In this case, the ratio of the total power consumption of the light sources of the third light source module 30 and the fourth light source module 40 to the total power consumption of the light sources of the first light source module 10 and the second light source module 20 may be 1:n (e.g., 1:4) as described above.

Figure 15:
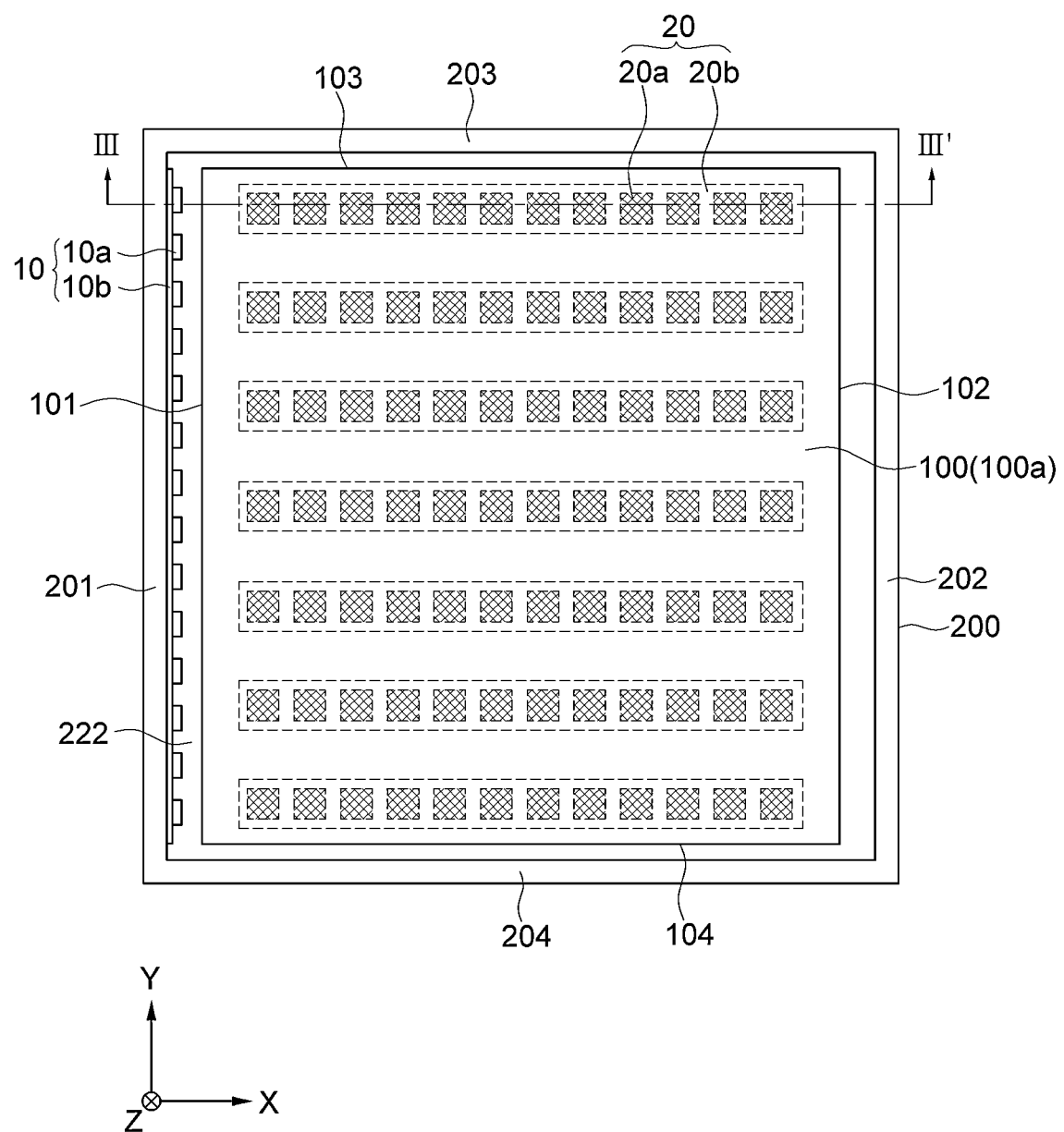
FIG. 15 is a plan view of a lighting device according to another embodiment of the present disclosure.
Figure 16:
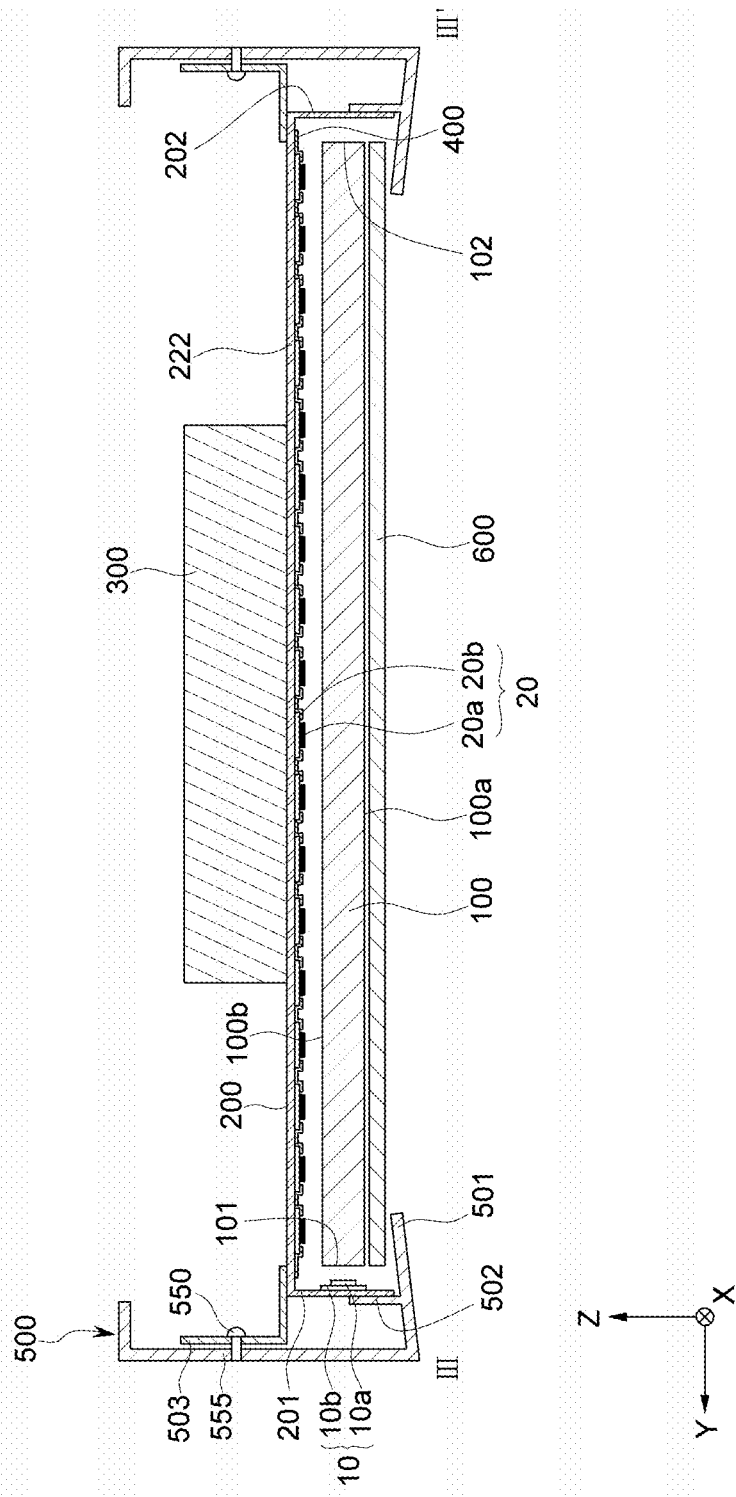
FIG. 16 is a cross-sectional view taken along line of FIG. 15.

FIG. 15 is a plan view of a lighting device according to another embodiment of the present disclosure, and FIG. 16 is a cross-sectional view taken along line of FIG. 15.

The lighting device of the present disclosure having the structure of FIGS. 15 and 16 is a hybrid-type lighting device, and may include the first light source module 10 including the plurality of first light sources 10a arranged along the first side surface 101 of the light guide plate 100 and the second light source module 20 arranged on the base part 222 of the cover part 200. In this case, the second light source module 20 may be arranged between the base part 222 and the upper surface 100b of the light guide plate 100. Meanwhile, when the plurality of second light source modules 20 are provided, as illustrated in FIG. 15, the plurality of second light source modules 20 may be arranged in a line along the Y-axis direction.

The first light source module 10 may include the plurality of first light sources 10a and the first light source circuit board 10b, and the plurality of first light sources 10a may be arranged in a line along the Y-axis direction while facing the first side surface 101 of the light guide plate 100. Each of the first light sources 10a may be the above-described white LED.

The second light source module 20 may include the plurality of second light sources 20a and the second light source circuit board 20b, and the plurality of second light sources 20a may be arranged in a line along the X-axis direction. Each of the second light sources 20a may be the above-described natural LEDs (e.g., Sunlike LEDs).

The first light source module 10 and the second light source module 20 (or the second light source modules 20) may be supplied with power from the power supply unit 300.

The ratio of the power consumption of the first light source module 10 and the power consumption of the second light source module 20 (or second light source modules 20) may be 1:n (e.g., 1:4) as described above. As a more specific example, the total power consumption of the first light sources 10a of the first light source module 10 may be 10 W, and the total power consumption of the second light sources 20a of the second light source module 20 (or second light source modules 20) may be 40 W.

Meanwhile, the light guide plate 100 of FIGS. 15 and 16 may include a light guide pattern. For example, the light guide patterns may be arranged on the upper surface of the light guide plate 100, and the light intensity in the blue wavelength region of the light incident from the white LED (i.e., the second light source 20a) to the upper surface 100a of the light guide plate 100 may be further reduced by these light guide patterns.

The lighting device of the present disclosure having the structure (a structure in which the white LED and the natural light LED are mixed, and the ratio of the power consumption of the white LED and the power consumption of the natural LED is about 1:4) of FIG. 15 may sufficiently satisfy the reference light efficiency of the high-efficiency lighting device while emitting a smaller amount of blue light than the lighting device using only the white LED.

Meanwhile, since the remaining components of FIGS. 15 and 16 are the same as the above-described components of FIGS. 1 and 2, the descriptions of the remaining components not described in FIGS. 15 and 16 refer to FIGS. 1 and 2 and related descriptions.

Figure 17:
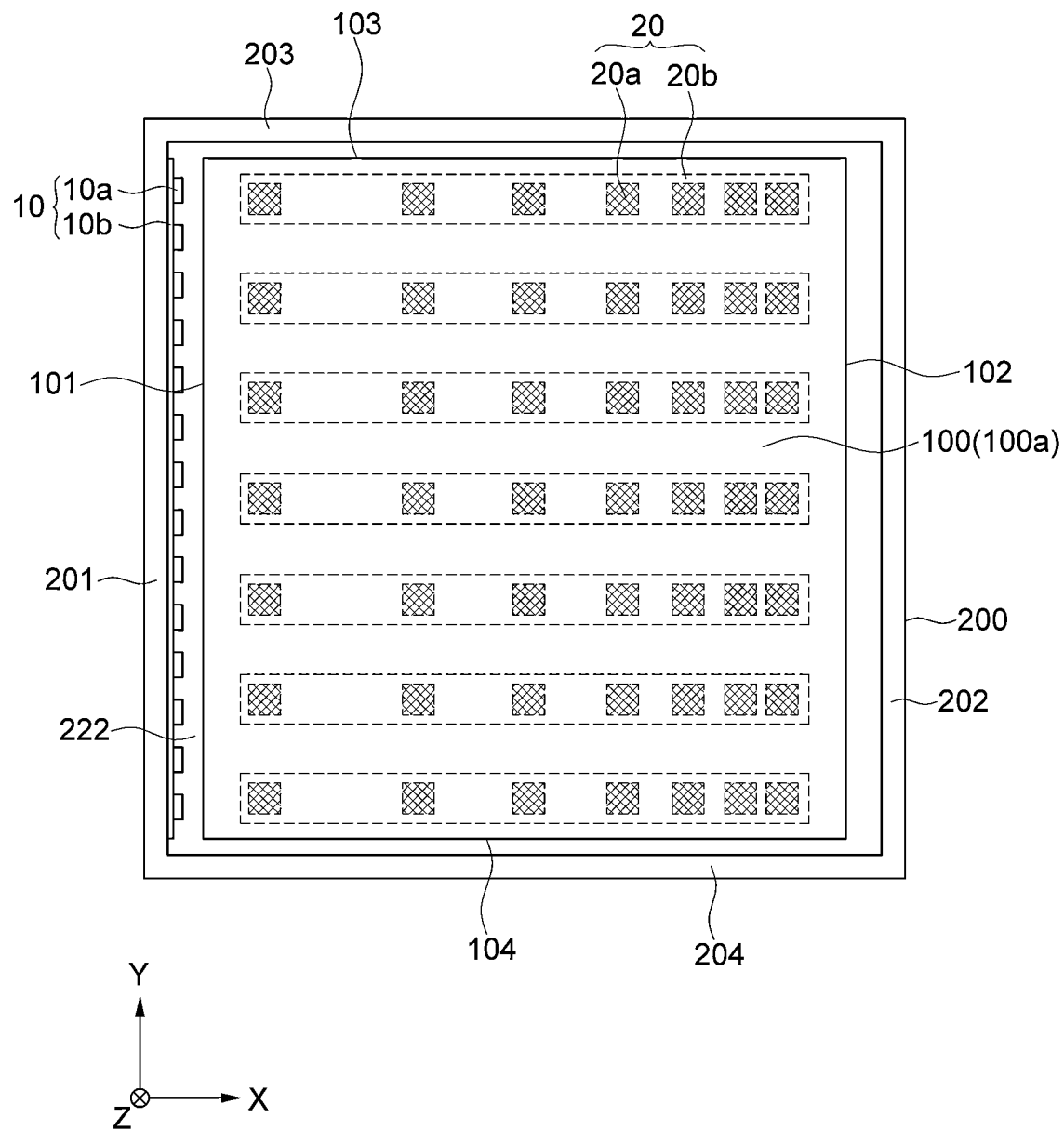
FIG. 17 is a plan view of a lighting device according to another embodiment of the present disclosure.

FIG. 17 is a plan view of a lighting device according to another embodiment of the present disclosure.

The lighting device of the present disclosure having the structure of FIG. 17 is substantially the same as the lighting device of the present disclosure having the structure of FIGS. 15 and 16 described above. However, according to the lighting device of the present disclosure having the structure of FIG. 17, as the second light sources 20a of the second light source module 20 are arranged further away from the first light source module 10 (or the first light source 10a), the interval between adjacent second light sources 20a may gradually decrease. Accordingly, the deviation in the amount of light in the vicinity of the first side surface 101 and the vicinity of the second side surface 102 of the light guide plate 100 may be minimized. That is, the first light sources 10a are arranged closer to the first side surface 101 than the second side surface 102 of the light guide plate 100, so the light from the first light sources 10a may decrease near the second side surface 102 than the first side surface 101 of the light guide plate 100. However, since a relatively larger number of second light sources 20a are densely arranged near the second side surface 102 of the light guide plate 100 than near the first side surface 101, the amount of light in the vicinity of the second side surface 102 may be compensated for by the generated light. Accordingly, the deviation in the amount of light between the first side surface 101 and the second side surface 102 may be reduced.

The first light source module 10 may include the plurality of first light sources 10a and the first light source circuit board 10b, and the plurality of first light sources 10a may be arranged in a line along the Y-axis direction while facing the first side surface 101 of the light guide plate 100. Each of the first light sources 10a may be the above-described white LED.

The second light source module 20 may include the plurality of second light sources 20a and the second light source circuit board 20b, and the plurality of second light sources 20a may be arranged in a line along the X-axis direction. Each of the second light sources 20a may be the above-described natural LEDs (e.g., Sunlike LEDs).

The first light source module 10 and the second light source module 20 (or the second light source modules 20) may be supplied with power from the power supply unit 300.

The ratio of the power consumption of the first light source module 10 and the power consumption of the second light source module 20 (or second light source modules 20) may be 1:n (e.g., 1:4) as described above. As a more specific example, the total power consumption of the first light sources 10a of the first light source module 10 may be 10 W, and the total power consumption of the second light sources 20a of the second light source module 20 (or second light source modules 20) may be 40 W.

The lighting device of the present disclosure having the structure (a structure in which the white LED and the natural light LED are mixed, and the ratio of the power consumption of the white LED and the power consumption of the natural LED is about 1:4) of FIG. 17 may sufficiently satisfy the reference light efficiency of the high-efficiency lighting device while emitting a smaller amount of blue light than the lighting device using only the white LED.

Meanwhile, since the remaining components of FIG. 17 are the same as the above-described components of FIGS. 15 and 16, the descriptions of the remaining components not described in FIG. 17 refer to FIGS. 15 and 16 and related descriptions.

Meanwhile, the light guide plate 100 of FIG. 17 may include the light guide pattern.

Figure 18:
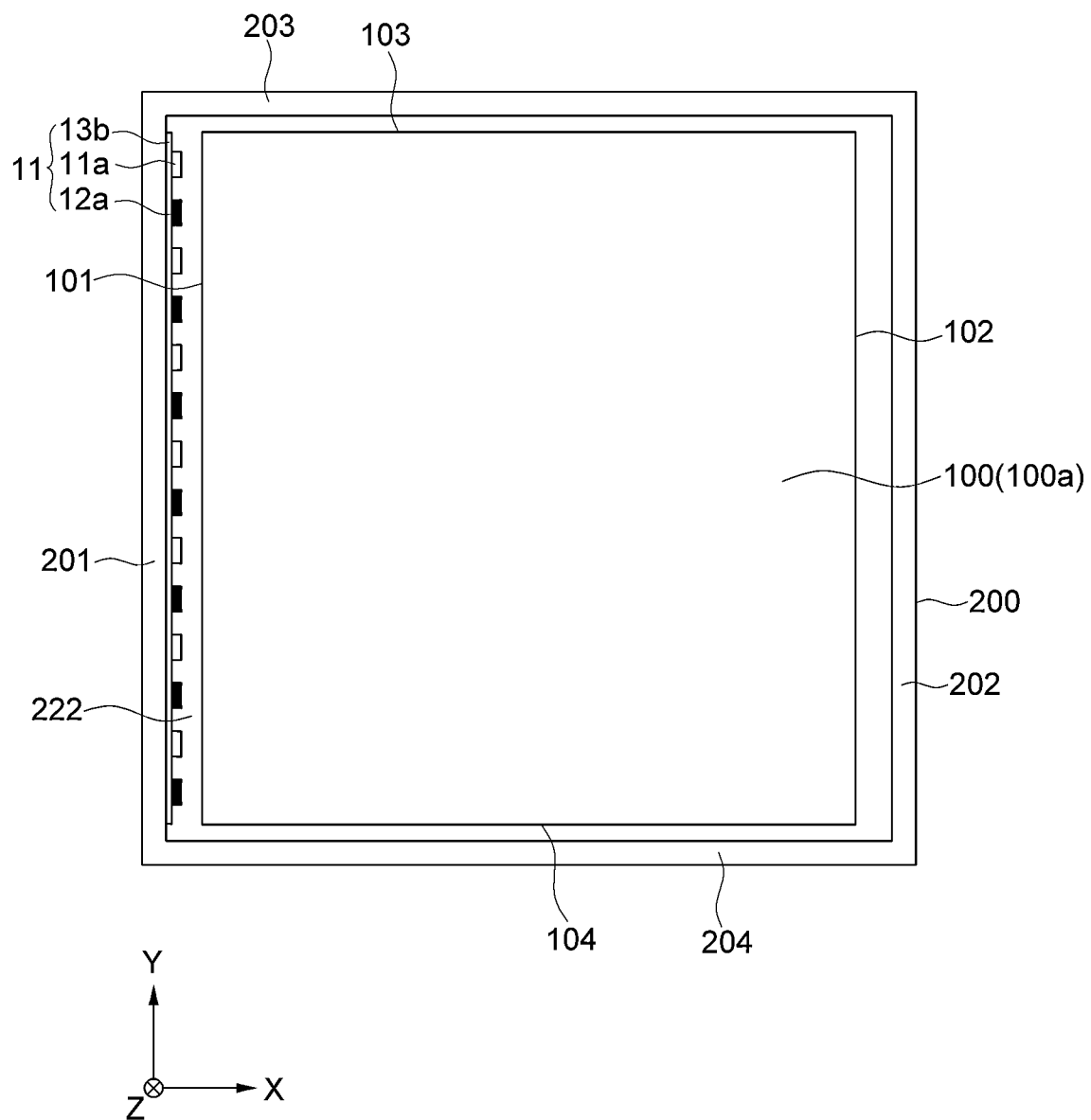
FIG. 18 is a plan view of a lighting device according to another embodiment of the present disclosure.

FIG. 18 is a plan view of a lighting device according to another embodiment of the present disclosure.

The lighting device of the present disclosure having the structure of FIG. 18 may include a light source module 11 including a first light source 10a, a second light source 20a, and a light source circuit board 13b. In this case, the first light source 11a and the second light source 12a may be alternately arranged along the first side surface 101 of the light guide plate 100.

The first light sources 11a may each be the above-described white LEDs, and the second light sources 12a may each be the above-described natural LED (e.g., Sunlike LED).

The first light sources 11a and the second light sources 12a may be supplied with power from the power supply unit 300.

The ratio of the power consumption of the first light sources 10a and the power consumption of the second light source 20a may be 1:n (e.g., 1:4) as described above. As a more specific example, the total power consumption of the first light sources 10a may be 10 W, and the total power consumption of the second light sources 20a may be 40 W.

The lighting device of the present disclosure having the structure (a structure in which the white LED and the natural light LED are mixed, and the ratio of the power consumption of the white LED and the power consumption of the natural LED is about 1:4) of FIG. 18 may sufficiently satisfy the reference light efficiency of the high-efficiency lighting device while emitting a smaller amount of blue light than the lighting device using only the white LED.

Meanwhile, since the remaining components of FIG. 18 are the same as the above-described components of FIGS. 1 and 2, the descriptions of the remaining components not described in FIG. 18 refer to FIGS. 1 and 2 and related descriptions.

Meanwhile, the light guide plate 100 of FIG. 18 may include the light guide pattern.

Figure 19:
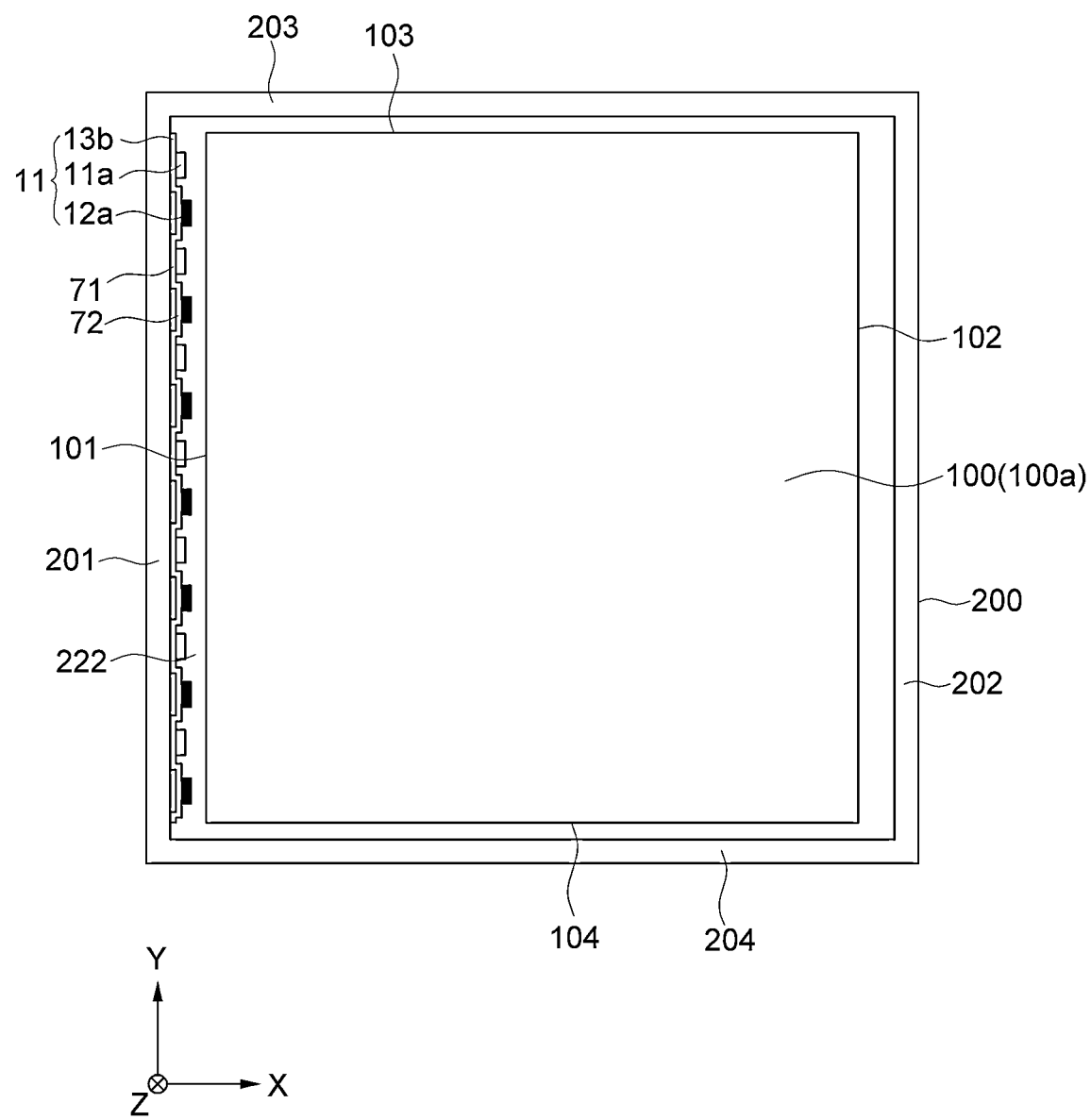
FIG. 19 is a plan view of a lighting device according to another embodiment of the present disclosure.

FIG. 19 is a plan view of a lighting device according to another embodiment of the present disclosure.

The lighting device of the present disclosure having the structure of FIG. 19 is substantially the same as the lighting device of the present disclosure having the structure of FIG. 18 described above. However, according to the lighting device of the present disclosure having the structure of FIG. 19, the first light source 10a is arranged farther from the first side surface 101 of the light guide plate 100 than the second light source 20a. In other words, the distance between the first light source 10a and the first side surface 101 of the light guide plate 100 is greater than the distance between the second light source 20a and the first side surface 101 of the light guide plate 100. To this end, the light source circuit board 13b of the light source module 11 may have an uneven shape. A recessed portion 71 of the light source circuit board 13b is disposed farther from the first side surface 101 of the light guide plate 100 than a protruding portion 2. The first light source 10a may be arranged on the recessed portion 71 of the light source circuit board 11, and the second light source 20a may be arranged on the protruding portion 2 of the light source circuit board 11.

The first light sources 10a may each be the above-described white LEDs, and the second light sources 20a may each be the above-described natural LED (e.g., Sunlike LED).

The first light sources 10a and the second light sources 20a may be supplied with power from the power supply unit 300.

The ratio of the power consumption of the first light sources 10a and the power consumption of the second light source 20a may be 1:n (e.g., 1:4) as described above. As a more specific example, the total power consumption of the first light sources 10a may be 10 W, and the total power consumption of the second light sources 20a may be 40 W.

In addition, since the first light source 10a which is the white LED is arranged farther from the light guide plate 100 than the second light source 20a which is the natural LED, the light intensity in the blue wavelength region of the light incident on the light guide plate 100 from the white LED may be further reduced.

The lighting device of the present disclosure having the structure (a structure in which the white LED and the natural light LED are mixed, and the ratio of the power consumption of the white LED and the power consumption of the natural LED is about 1:4) of FIG. 19 may satisfy the reference light efficiency of the high-efficiency lighting device while emitting a smaller amount of blue light than the lighting device using only the white LED.

Meanwhile, the light guide plate 100 of FIG. 19 may include the light guide pattern.

Figure 20:
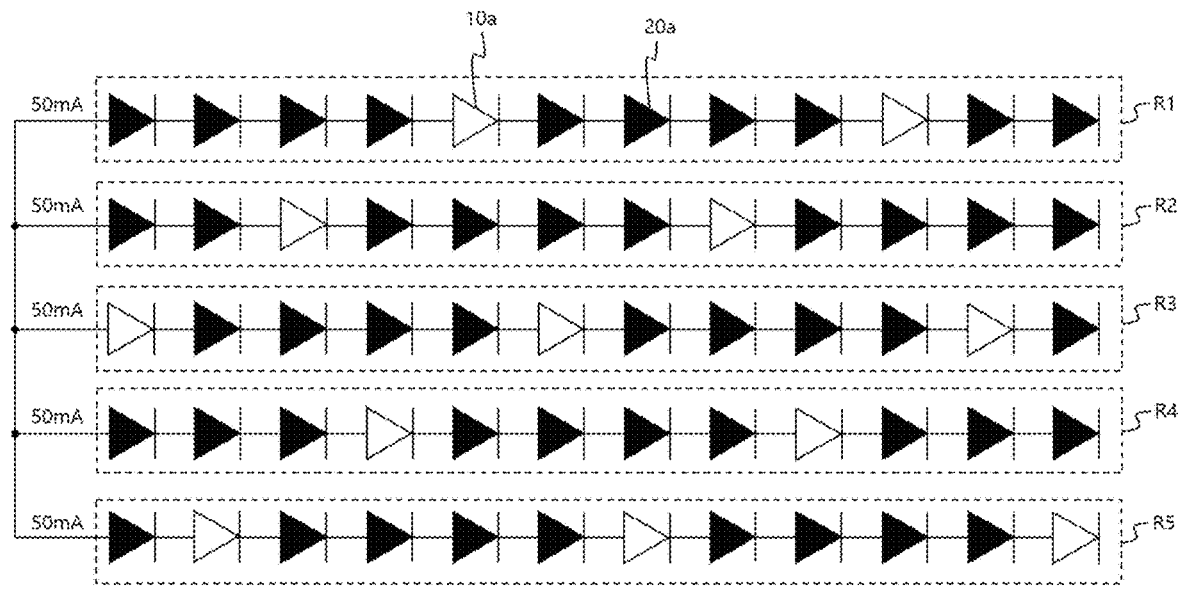
FIG. 20 is a diagram illustrating a spectral distribution and a color coordinate system of light emitted from the lighting device of FIG. 1.
Figure 21:
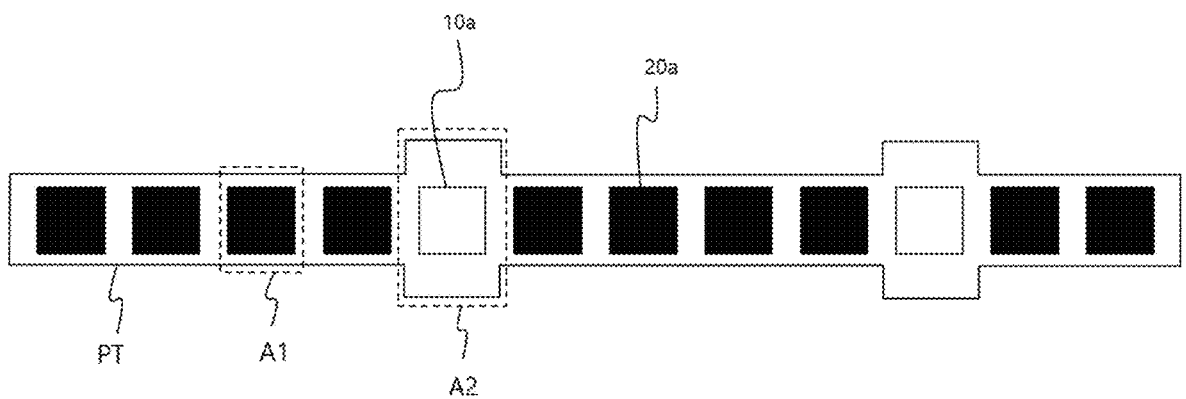
FIG. 21 is a diagram illustrating light sources and a pattern layer in a first column of FIG. 20.

FIG. 20 is a plan view of a lighting device according to another embodiment of the present disclosure, and FIG. 21 is a diagram illustrating light sources and a pattern layer in a first column of FIG. 20.

As illustrated in FIG. 20, the lighting device of the present disclosure may include the plurality of first light sources 10a and the plurality of second light sources 20a. For example, 12 light sources per column may be connected in series with each other, and 5 columns may be connected in parallel with each other. In this case, 12 light sources arranged in one column may include the first light sources 10a and the second light sources 20a. As a specific example, two first light sources 10a and ten second light sources 20a are connected in series with each other and arranged in a first column R1, a second column R2, and a fourth column R4, and three first light sources 10a and nine second light sources 20a are connected in series with each other and arranged in the third column R3 and the fourth column R4. In this case, as illustrated in FIG. 20, light sources generally include four second light sources 20a and one first light source 10a that may be sequentially arranged in a zigzag direction from a left end portion of the first column R1 to a right end of a fifth column R5.

A current of 50 mA may be supplied to each of the first to fifth columns R1 to R5. The power supply unit 300 may supply a voltage of 36V and a current of 250 mA to the light sources of the first to fifth columns R1 to R5 as power sources.

Each first light source 10a may be the white LED as described above, and each second light source 20a may be the natural LED as described above. Here, a voltage (e.g., a forward voltage of a diode) across the second light source 20a may be higher than that across the first light source 10a. For example, the voltage across the first light source 10a may be 2.68V, and the voltage across the second light source 20a may be 2.8V.

An average voltage across 12 light sources in the first column R1 is 2.78 (=((2.68*2)+(2.8*10))/12), and an average voltage across 12 light sources in the third column R3 is 2.77(=((2.68*3)+(2.8*9))/12). The average voltage across 12 light sources in the second column R2 and the average voltage across 12 light sources in the fourth column R4 are the same as 2.78V in the first column R1, and the average voltage across 12 light sources in the fifth column R5 is 2.77V as in the third column. In this case, the average voltage across one column is higher than the voltage across the first light source 10a in the column, but is smaller than the voltage across the second light source 20a in the column. Accordingly, a higher load is applied to the first light source 10a than to the second light source 20a. Accordingly, a lot of heat may be generated from the first light source 10a, and the lifetime of the first light source 10a may be shortened due to this heat, which means that the lifetime of the lighting device is reduced.

In order to solve the problem of this reduction in lifespan, as illustrated in FIG. 21, a region A2 corresponding to the first light source 10a of the pattern layer (PT; for example, a copper foil layer) of the light source circuit board may have a larger area.

For example, the first light source 10a and the second light source 20a are mounted on the light source circuit board, and the light source circuit board may include a pattern layer PT connected to the first light source 10a and the second light source 20a therein. The pattern layer PT is, for example, a copper foil layer, and the copper foil layer may be a grounding layer.

The pattern layer PT may include a first region A1 in which the first light source 10a is arranged and a second region A2 in which the second light source 20a is arranged, and an area of the first region A2 may be larger than that of the second region A1. For example, the second region A2 may be twice as large as the first region A1. Accordingly, the problem that heat from the first light source 10a is effectively radiated to the outside and the lifespan of the first light source 10a is reduced may be solved.

Meanwhile, in all the above-described embodiments including FIG. 20, the ratio of the total power consumption of the first light sources and the total power consumption of the second light sources is 1:n as described above, and the ratio of the number of first light sources 10a and the number of second light sources 20a may also be 1:n as described above. For example, in FIG. 20, the ratio of the total power consumption (1608 mW) of the first light sources 10a and the total power consumption (6720 mW) of the second light sources 20a is about 1:4. In this case, the ratio of the number (12) of first light sources 10a and the number (48) of second light sources 20a may satisfy the above-described 1:4. Here, the ratio of the number of first light sources 10a and the number of second light sources 20a may be calculated using a Gaussian function. For example, when the above-described ratio of power consumption is 1:n, the above-described ratio of the number of light sources may be 1:[n]. As a specific example, when the ratio of the total power consumption (1608 mW) of the first light sources 10a and the total power consumption (6720 mW) of the second light sources 20a is about 1:4.17, the ratio of the number (12) of first light sources 10a and the number (48) of second light sources 20a may be the above-described 1:4.

The lighting device of FIGS. 20 and 21 may be applied to, for example, the direct-type lighting device.

Figure 22:
FIG. 22 is a plan view of a lighting device according to another embodiment of the present disclosure.
Figure 23:
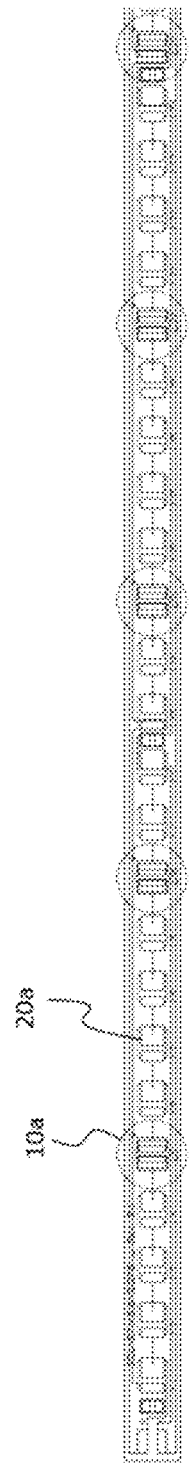
FIG. 23 is an enlarged view of a portion of FIG. 22.

FIG. 22 is a plan view of a lighting device according to another embodiment of the present disclosure, and FIG. 23 is an enlarged view of a portion of FIG. 22.

As illustrated in FIGS. 22 and 23, the lighting device of the present disclosure may include the plurality of first light sources 10a and the plurality of second light sources 20a. The total number of light sources (i.e., light sources including the first light sources 10a and the second light sources 20a) of FIGS. 21 and 22 may be 96. In this case, 12 light sources adjacent to the left side portion may be connected in series with each other. For example, 96 light sources may be divided into 8 light source groups including 12 light sources from the left side portion. In other words, 96 light sources may be divided into a first light source group, a second light source group, a third light source group, a fourth light source group, a fifth light source group, a sixth light source group, a seventh light source group, and an eighth light source group. In this case, each light source group includes 12 light sources connected in series with each other, and 12 light sources may include the above-described first light source and second light source. Meanwhile, each light source group is connected in parallel with each other. For example, the first to eighth light source groups may be connected in parallel with each other.

Meanwhile, 96 light sources include four second light sources 20a and one first light source 10 that may be sequentially arranged in one direction from the light source (e.g., the second light source 20a) located at the left end to the light source (e.g., the second light source 20a) located at the right end.

Each of the first light sources 10a may correspond to the above-described white LED, and each of the second light sources 20a may correspond to the above-described natural LED.

A ratio of the total power consumption of all the first light sources 10a to the total power consumption of all the second light sources 20a may be 1:n. Here, n may be greater than 1 as described above. As an example, n may have a size of 3.8 to 4.5. For example, when n is 4, the total power consumption obtained by summing all individual power consumptions of each of all the first light sources 10a may be 10 W, and the total power consumption obtained by summing all individual power consumptions of each of all the second light sources 20a may be 40 W.

The lighting device of FIGS. 22 and 23 may be applied to, for example, a direct-type lighting device, an edge-type lighting device with a light guide plate, or a hybrid lighting device.

Figure 24:
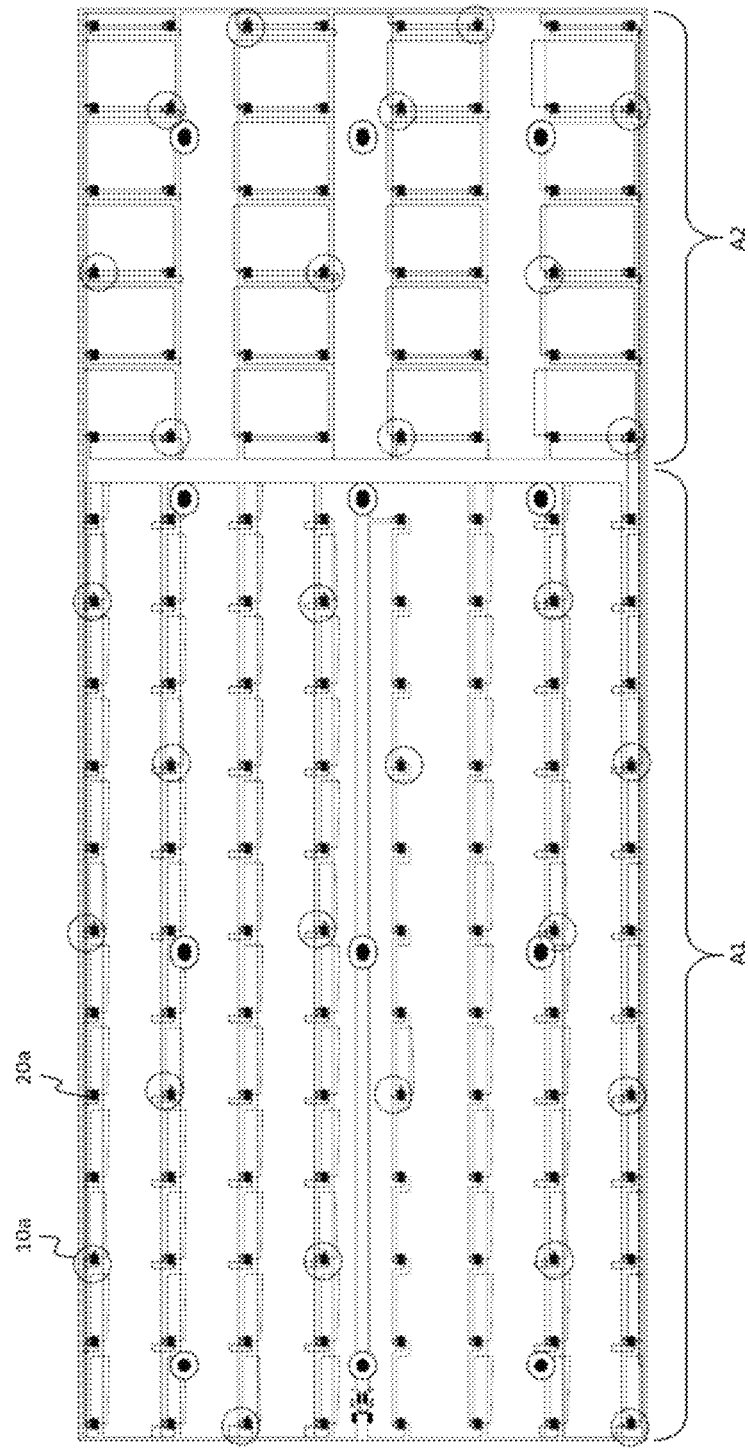
FIG. 24 is a plan view of a lighting device according to another embodiment of the present disclosure.

FIG. 24 is a plan view of a lighting device according to another embodiment of the present disclosure.

As illustrated in FIG. 24, the lighting device of the present disclosure may include the plurality of first light sources 10a and the plurality of second light sources 20a. The total number of light sources of FIG. 24 (i.e., light sources obtained by summing the first light source 10a and the second light source 20a) may be 144.

For example, 144 light sources may be divided into 12 light source groups including 12 light sources. In other words, 144 light sources may be divided into a first light source group, a second light source group, a third light source group, a fourth light source group, a fifth light source group, a sixth light source group, a seventh light source group, an eighth light source group, a ninth light source group, a tenth light source group, an eleventh light source group, and a twelfth light source group. In this case, each light source group includes 12 light sources connected in series with each other, and 12 light sources may include the above-described first light source and second light source. Meanwhile, each light source group is connected in parallel with each other. For example, the first to twelfth light source groups may be connected in parallel with each other.

The storage space defined by the cover part 200 may include the first region A1 and the second region A2, and the first to eighth light source groups may be arranged in the first region A1 and the ninth to twelfth light source groups may be arranged in the second region A2. In this case, 96 light sources may be arranged in the first region A1, and 48 light sources may be arranged in the second region A2.

12 light sources arranged along one column are connected in series with each other in the first region A1, and 12 series light sources in one column correspond to one light source group in the first region A1.

12 light sources arranged along two adjacent columns are connected in series with each other in the second region A2, and series light sources in two columns correspond to one light source group in the second region A2.

Each of the first light sources 10a may correspond to the above-described white LED, and each of the second light sources 20a may correspond to the above-described natural LED.

A ratio of the total power consumption of all the first light sources 10a to the total power consumption of all the second light sources 20a may be 1:n. Here, n may be greater than 1 as described above. As an example, n may have a size of 3.8 to 4.5. For example, when n is 4, the total power consumption obtained by summing all individual power consumptions of each of all the first light sources 10a may be 10 W, and the total power consumption obtained by summing all individual power consumptions of each of all the second light sources 20a may be 40 W.

The lighting device of FIG. 24 may be applied to, for example, the direct-type lighting device.

Figure 25:
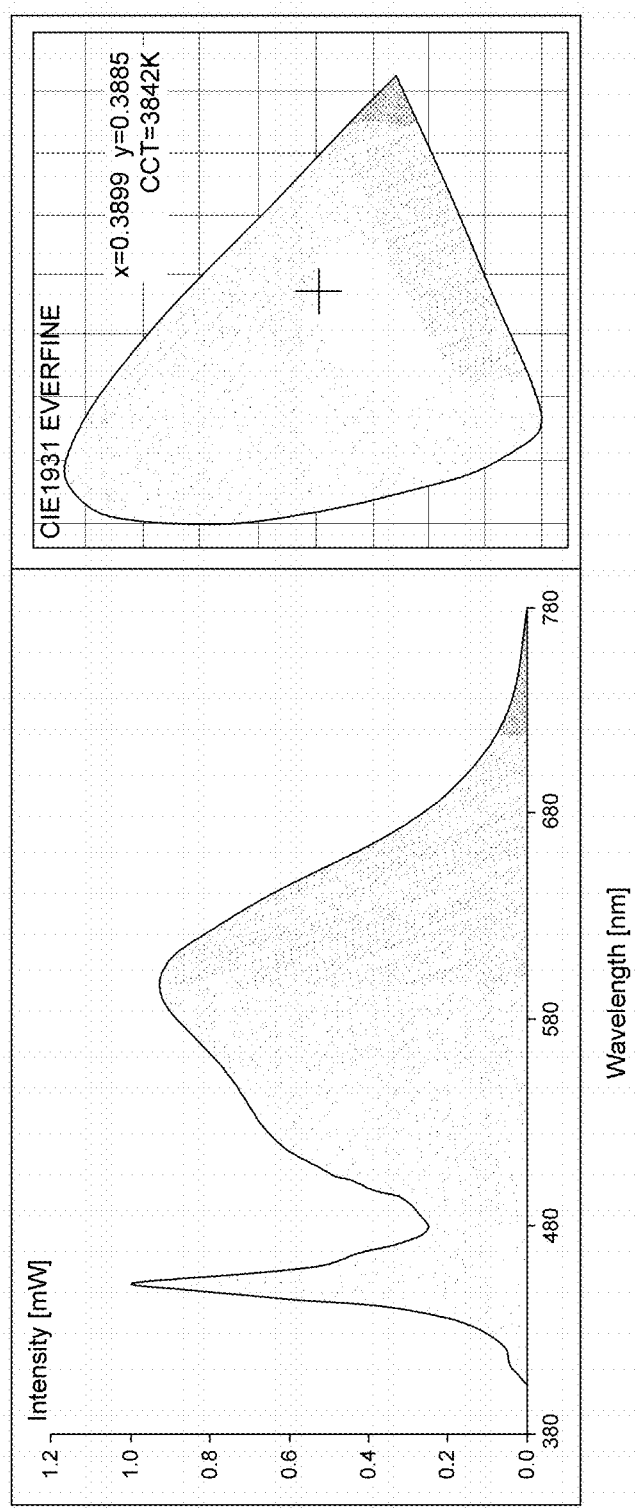
FIG. 25 is a diagram illustrating the spectral distribution and the color coordinate system of the light emitted from the lighting device of FIG. 1.

FIG. 25 is a diagram illustrating the spectral distribution and the color coordinate system of the light emitted from the lighting device of FIG. 1.

According to the spectral distribution of light emitted from the lighting device of the present disclosure having the above-described structure as in FIG. 1, the light intensity in the blue light wavelength region decreases, whereas the light efficiency of the light increases.

The spectral distribution in FIG. 25 shows the spectral distribution at a color temperature of 3842K, and coordinates x and y of the color coordinate system corresponding to the color temperature are 0.3899 and 0.3885. This coordinates correspond to an intersection of a cross (+) in the color coordinate system.

Figure 27:
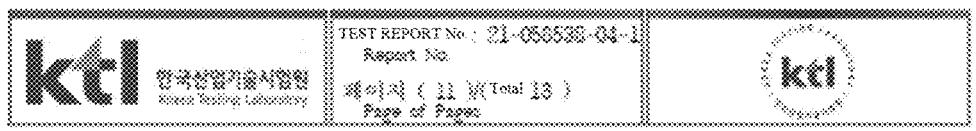
Figure 28:
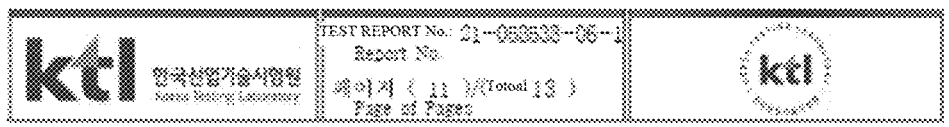
Figure 29:
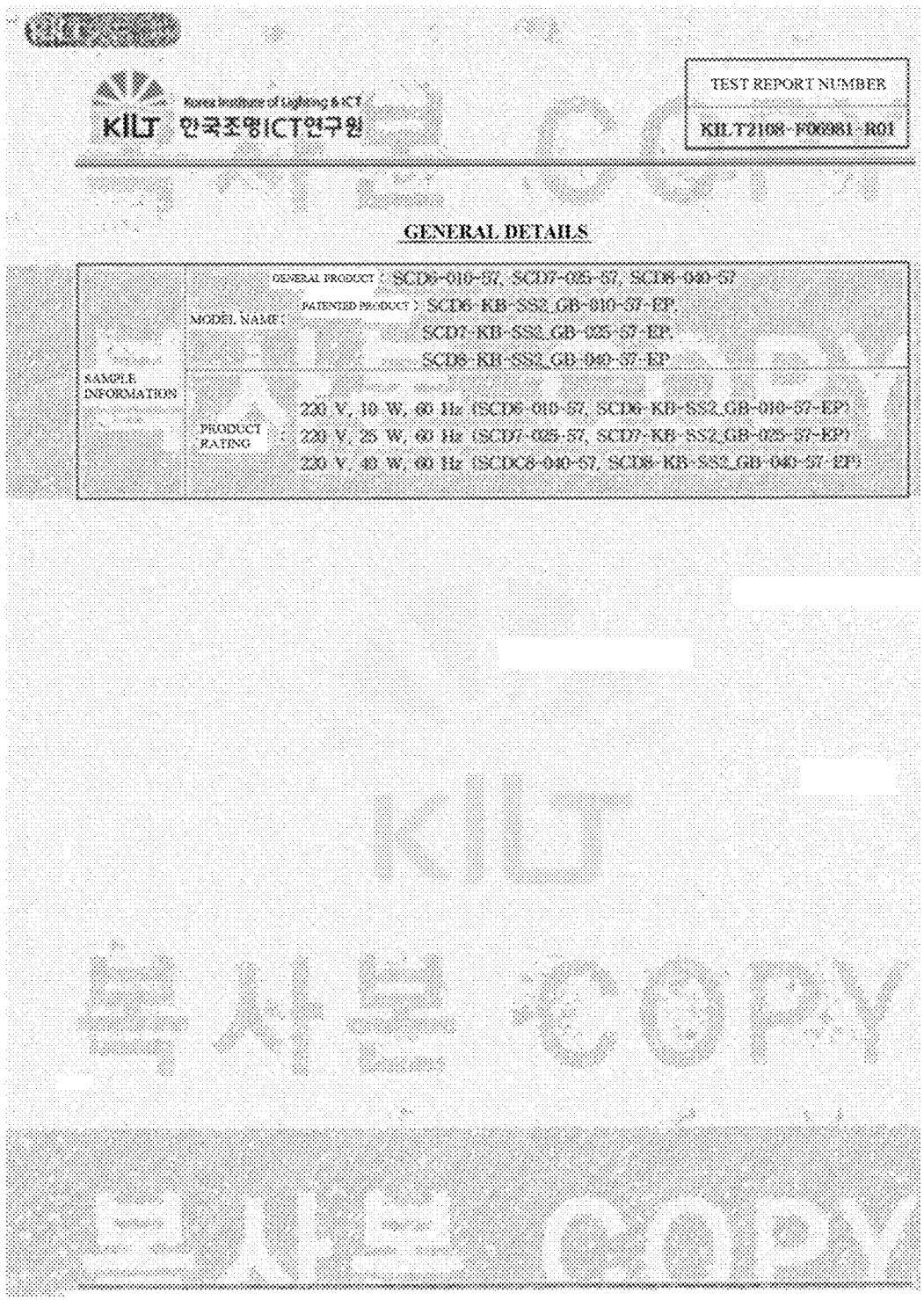
Figure 30:
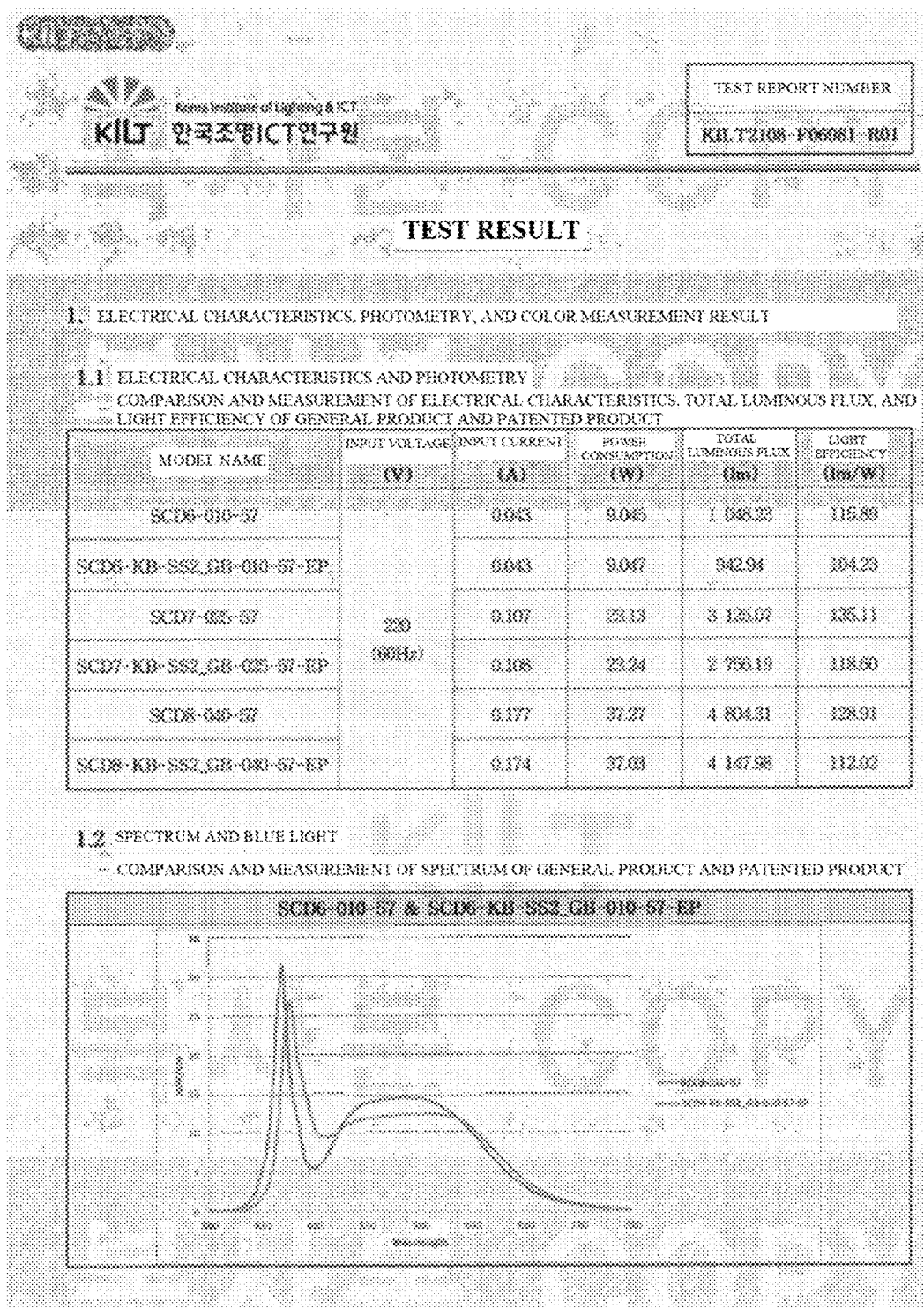
Figure 31:
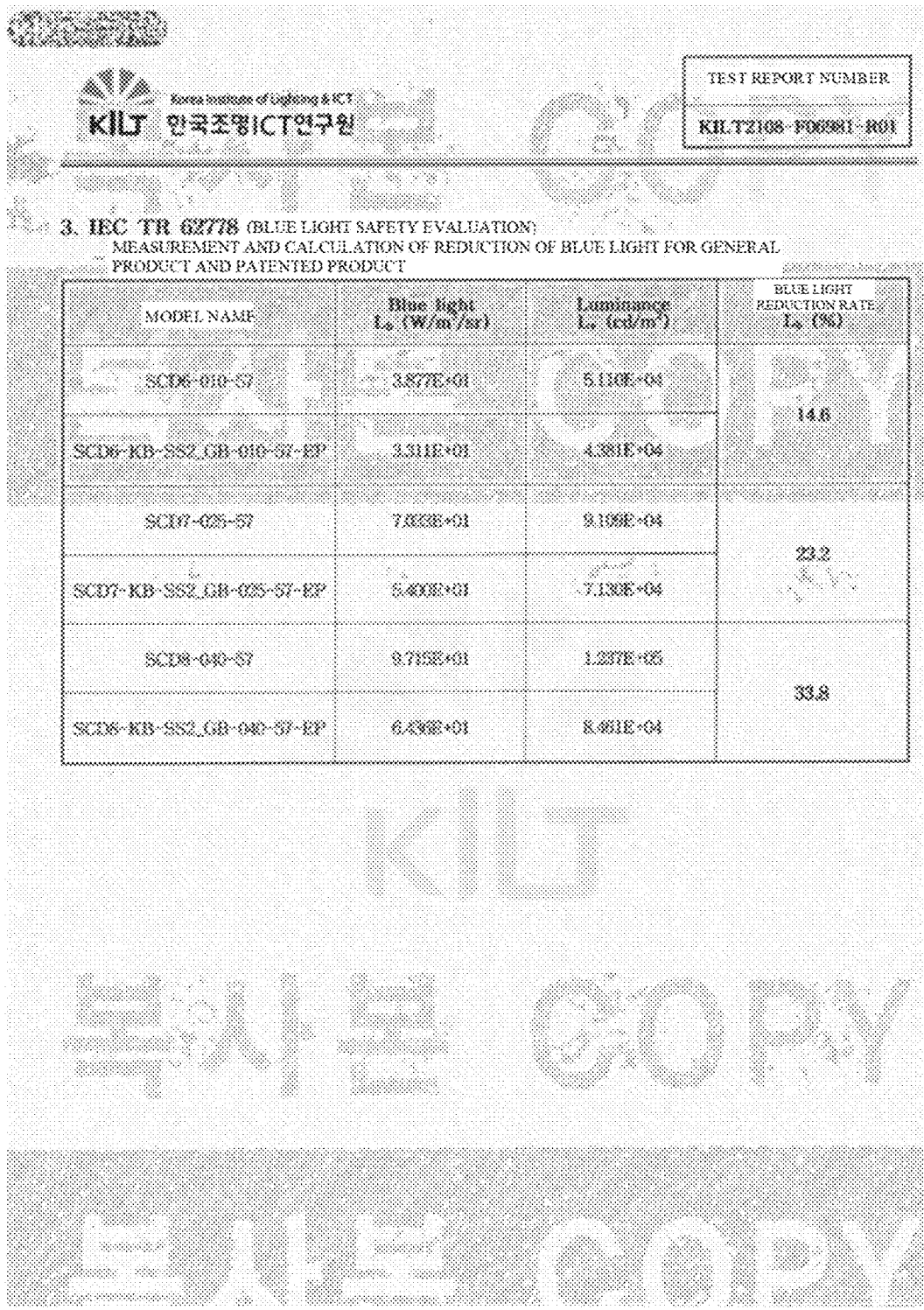

FIGS. 26 to 31 are diagrams for describing the effect according to the lighting device of the present disclosure. Here, FIGS. 26 to 28 are test reports from the Korea Testing Laboratory, and FIGS. 29 to 31 are test reports from the Korea Institute of Lighting & ICT.

First, as illustrated in FIG. 26, the lighting device of the present disclosure may include an LED package (model name: SPMWHD32AMD EXAQOSM) of Samsung Electronics CO., LTD. as the first light source corresponding to the white LED, and an LED package (model name: S-G3030PN29P3 3030 HIGH CRI) of GLB Tech as the second light source corresponding to the natural LED. In this case, as illustrated in FIG. 23, in a state in which the power consumption of the first light source and the power consumption of the second light source are set to have substantially the same value, 12 first light sources and 48 second light sources are arranged. When these light sources are driven, the ratio of the total power consumption of 12 first light sources and the total power consumption of 48 second light sources may be adjusted to 1:4. Here, the embodiment in which 12 first light sources and 48 second light sources are driven to have the power consumption of 1:4 as illustrated in FIG. 23 is defined as the first embodiment.

In addition, as illustrated in FIG. 27, the lighting device of the present disclosure may include the above-described LED package (model name: SPMWHD32AMD EXAQOSM) of Samsung Electronics CO., LTD., as the first light source corresponding to the white LED, and the above-described LED package (model name: S-G3030PN29P3 3030 HIGH CRI) of GLB Tech as the second light source corresponding to the natural LED. In this case, as illustrated in FIG. 27, in a state in which the power consumption of the first light source and the power consumption of the second light source are set to have substantially the same value, 24 first light sources and 96 second light sources are arranged. When these light sources are driven, the ratio of the total power consumption of 24 first light sources and the total power consumption of 96 second light sources may be adjusted to 1:4. Here, the embodiment in which 24 first light sources and 96 second light sources are driven to have the power consumption of 1:4 as illustrated in FIG. 24 is defined as the second embodiment.

In addition, as illustrated in FIG. 28, the lighting device of the present disclosure may include the above-described LED package (model name: SPMWHD32AMD EXAQOSM) of Samsung Electronics CO., LTD., as the first light source corresponding to the white LED, and the above-described LED package (model name: S-G3030PN29P3 3030 HIGH CRI) of GLB Tech as the second light source corresponding to the natural LED. In this case, as illustrated in FIG. 25, in a state in which the power consumption of the first light source and the power consumption of the second light source are set to have substantially the same value, 34 first light sources and 134 second light sources are arranged. When these light sources are driven, the ratio of the total power consumption of 34 first light sources and the total power consumption of 134 second light sources may be adjusted to 1:4. Here, the embodiment in which 25 first light sources and 134 second light sources are driven to have the power consumption of 1:4 as illustrated in FIG. 34 is defined as the third embodiment.

The above-described lighting device according to the first embodiment of FIG. 26 corresponds to the SCD6-KB-SS2_GB-010-57-EP of FIG. 29, and the above-described lighting device according to the second embodiment of FIG. 27 corresponds to SCD7-KB-SS2_GB-025-57-EP of FIG. 29, and the above-described lighting device according to the third embodiment of FIG. 25 corresponds to SCD8-KB-SS2_GB-040-57-EP of FIG. 29. Meanwhile, SCD6-010-57 is a first comparison object corresponding to the lighting device of the first embodiment, and the first comparison object is a conventional lighting device including only 60 white LEDs. In addition, SCD7-025-57 is a second comparison object corresponding to the lighting device of the second embodiment, and the second comparison object is a conventional lighting device including only 120 white LEDs. In addition, SCD8-040-57 is a third comparison object corresponding to the lighting device of the third embodiment, and the third comparison object is a conventional lighting device including only 168 white LEDs.

As illustrated in FIG. 30, the high efficiency reference in the section (9.045 W and 9.047 W) in which the power consumption is 10 W or less is 100 lm/W, and the light efficiency of the first comparison object and the light efficiency of the first embodiment are 115.89 and 104.23, respectively, all of which satisfy the high efficiency reference in the corresponding power consumption. In addition, the high efficiency reference in the section (23.13 W and 23.24 W) in which the power consumption is greater than 10 W and is 30 W or less is 105 lm/W, and the light efficiency of the second comparison object and the light efficiency of the second embodiment are 135.11 and 118.60, respectively, all of which satisfy the high efficiency reference in the corresponding power consumption. The high efficiency reference in the section (37.27 W and 37.03 W) in which the power consumption is greater than 30 W is 110 lm/W, and the light efficiency of the third comparison object and the light efficiency of the third embodiment are 128.91 and 112.02, respectively, all of which satisfy the high efficiency reference in the corresponding power consumption.

Accordingly, as illustrated in FIG. 30, it can be seen that all of the lighting devices of the first to third embodiments of the present disclosure satisfy the high efficiency conditions.

In addition, as illustrated in the graph of FIG. 30, it can be seen that the graph (blue graph) of the first comparison object has high light intensity in the blue wavelength region (415 nm to 460 nm), whereas the graph (red graph) of the lighting device of the first embodiment has the low light intensity in the blue wavelength region.

In addition, as illustrated in FIG. 31, the lighting device of the first embodiment showed a 14.6% better blue light reduction effect than the first comparison object, the lighting device of the second embodiment showed a 23.2% better blue light reduction effect than the second comparison object, and the lighting device of the third embodiment showed a 33.8% better blue light reduction effect than the third comparative object.

Therefore, it can be seen that the lighting device according to the embodiment of the present disclosure provides the effect of reducing blue light while satisfying the high efficiency conditions.

It will be obvious to those skilled in the art to which the present disclosure pertains that the present disclosure described above is not limited to the above-mentioned exemplary embodiments and the accompanying drawings, but may be variously substituted, modified, and altered without departing from the scope and spirit of the present disclosure.

What is claimed is:

1. A lighting device, comprising:
a first light source comprising a plurality of white light emitting diodes (LEDs);
a second light source comprising a plurality of natural LEDs, having lower light efficiency than the first light source, and having a lower light intensity than the first light source in a blue light wavelength region; and
a circuit board comprising a pattern layer, the pattern layer including a first region in which the first light source is disposed and a second region in which the second light source is disposed;
wherein power is supplied to the first light source and the second light source so that a ratio of power consumption of the first light source to power consumption of the second light source becomes 1:n;
a ratio of the number of the white LEDs and the number of the natural LEDs is 1:n;
n is greater than 1;
a voltage across the white LEDs is lower than a voltage across the natural LEDs; and
a width of the pattern layer corresponding to the first region is larger than a width of the pattern layer corresponding to the second region.

2. The lighting device of claim 1, wherein n is 3.8 to 4.5.

3. The lighting device of claim 1, further comprising:
a light guide plate guiding the light from the first light source and the light from the second light source in a specific direction.

4. The lighting device of claim 3, wherein the first light source is arranged to face a side surface of the light guide plate, and the second light source is disposed to face an upper surface of the light guide plate.

5. The lighting device of claim 4, wherein the light guide plate includes a light guide pattern arranged on an upper surface of the light guide plate.

6. The lighting device of claim 1, wherein the first light source and the second light source are arranged in a direct type.

7. The lighting device of claim 1, wherein the second light source has a closer match rate to a solar spectrum than the first light source.

* * * * *